(12) United States Patent
Imamura et al.

(10) Patent No.: US 8,322,937 B2
(45) Date of Patent: Dec. 4, 2012

(54) THERMOCHROMIC WRITING INSTRUMENT

(75) Inventors: Yoshinori Imamura, Nagoya (JP); Nobuo Sekine, Nagoya (JP); Masashi Ando, Nagoya (JP)

(73) Assignee: The Pilot Ink Co., Ltd., Nagoya-Shi (JP)

( * ) Notice: Subject to any disclaimer, the term of this patent is extended or adjusted under 35 U.S.C. 154(b) by 606 days.

(21) Appl. No.: 12/528,724

(22) PCT Filed: Feb. 8, 2008

(86) PCT No.: PCT/JP2008/052167
§ 371 (c)(1),
(2), (4) Date: Aug. 26, 2009

(87) PCT Pub. No.: WO2008/105227
PCT Pub. Date: Sep. 4, 2008

(65) Prior Publication Data
US 2010/0098476 A1  Apr. 22, 2010

(30) Foreign Application Priority Data

Feb. 26, 2007 (JP) ................. 2007-046226
Jul. 21, 2007 (JP) ................. 2007-190261
Jan. 15, 2008 (JP) ................. 2008-005267

(51) Int. Cl.
*A47L 13/32* (2006.01)
*B43K 5/16* (2006.01)
(52) U.S. Cl. ............... 401/1; 401/99; 401/111
(58) Field of Classification Search ........ 401/1, 99, 401/195
See application file for complete search history.

(56) References Cited

U.S. PATENT DOCUMENTS

| 3,079,894 | A | | 3/1963 | Johmann | |
|---|---|---|---|---|---|
| 5,127,130 | A | | 7/1992 | Copito | |
| 6,206,595 | B1 | * | 3/2001 | Keda | ............ 401/195 |
| 6,224,282 | B1 | * | 5/2001 | Ueki | ............ 401/109 |

(Continued)

FOREIGN PATENT DOCUMENTS

CN  1840361 A  10/2006
(Continued)

OTHER PUBLICATIONS

International Search Report dated May 13, 2008 (PCT/JP2008/052167).

(Continued)

*Primary Examiner* — David Walczak
*Assistant Examiner* — Jennifer C Chiang
(74) *Attorney, Agent, or Firm* — Sughrue Mion, PLLC

(57) ABSTRACT

A thermochromic writing instrument contains a thermochromic ink, wherein a writing body 8 is accommodated in a barrel 2 movably in a longitudinal direction, an operation portion 5 is provided on the outer surface of the barrel 2, and a pen tip 81 of the writing body 8 is constituted so as to be projectable/retractable from/into a front-end hole 31 of the barrel 2 by operating the operation portion 5. The thermochromic ink 83 is contained in the inside of the writing body 8, the pen tip 81 capable of ejecting the thermochromic ink 83 is provided at the front end of the writing tool, and a friction portion 4 capable of thermally changing the color of the handwriting of the thermochromic ink 83 by the frictional heat generated when the handwriting is rubbed with the friction portion 4 is provided on the outer surface of the barrel 2.

24 Claims, 20 Drawing Sheets

U.S. PATENT DOCUMENTS

| | | |
|---|---|---|
| 6,979,142 B1 | 12/2005 | Chmelar |
| 7,018,124 B1 * | 3/2006 | Kageyama et al. ........... 401/258 |
| 7,946,777 B2 * | 5/2011 | Yamauchi et al. .............. 401/31 |
| 2006/0153626 A1 | 7/2006 | Mook et al. |
| 2007/0189836 A1 * | 8/2007 | Senga et al. .................. 401/195 |

FOREIGN PATENT DOCUMENTS

| | | |
|---|---|---|
| GB | 832527 A | 4/1960 |
| JP | 64-001596 A | 1/1989 |
| JP | 2004-148744 A | 5/2004 |
| JP | 2006-063238 A | 3/2006 |
| JP | 2006-123278 A | 5/2006 |
| JP | 2007-015277 A | 1/2007 |
| JP | 2008-062421 A | 3/2008 |

OTHER PUBLICATIONS

Extended European Search Report, issued by the European Patent Office in corresponding European Application No. 08711046.6 on Apr. 12, 2012.

Communication dated Apr. 6, 2012 from the State Intellectual Property Office of P.R. China in counterpart Chinese application No. 200880006223.1.

* cited by examiner

THERMOCHROMIC WRITING INSTRUMENT

TECHNICAL FIELD

The present invention relates to a thermochromic writing instrument. More specifically, it relates to a thermochromic writing instrument containing a thermochromic ink.

BACKGROUND ART

Hitherto, Patent Document 1 proposes a thermochromic writing instrument containing a thermochromic ink, in which a friction body for thermally changing the color of the handwriting of the thermochromic ink by frictional heat is provided on a top of a cap and in which the friction body is provided at a rear end of the barrel.
Patent Document 1: Japanese Patent Unexamined Publication No. JP-A-2004-148744

DISCLOSURE OF THE INVENTION

Problems that the Invention is to Solve

Since the above conventional thermochromic writing instrument is a cap type, it is necessary to perform the attaching/detaching operation of the cap by using both hands. If a user can use only one hand, it is difficult to rapidly bring the instrument into a writing-capable state or a stored state. Moreover, in the above conventional thermochromic writing instrument, if the friction body is provided at the rear end of the barrel, when the handwriting is rubbed and changed in color after writing, it is necessary to reverse the barrel and to shift the holding part of the barrel from the pen tip side to the rear end side, so that it is impossible to quickly shift to a rubbing-to-change-color operation.

The invention aims to solve the above problems and to provide a thermochromic writing instrument containing a thermochromic ink, which is capable of easily changing the color of the handwriting of the thermochromic ink by rubbing and also being quickly brought into a writing-capable state (pen-tip-projected state) or a stored state (pen-tip-retracted state) even if a user can use only one hand. In this connection, in the invention, "forward" means a pen tip side and "backward" means an opposite side thereof. In the invention, the "pen-tip-retracted state" means a state that a pen tip is retracted into the barrel and the "pen-tip-projected state" means a state that a pen tip is projected outside from the front end of the barrel.

Means for Solving the Problems

[1] A first aspect of the present invention relates to a thermochromic writing instrument containing a thermochromic ink, including:
a barrel 2;
a writing body 8 accommodated in the barrel 2 so as to be capably of moving in a longitudinal direction; and
an operation portion 5,
wherein a pen tip 81 of the writing body 8 is adapted to be project/retract from/into a front-end hole 31 of the barrel 2 by operating the operation portion 5,
the thermochromic ink 83 is contained inside the writing body 8,
a pen tip 81 capable of ejecting the thermochromic ink 83 is provided at a front end of the writing body 8, and
a friction portion 4 capable of thermally changing color of the handwriting of the thermochromic ink 83 by the frictional heat generated when the handwriting is rubbed with the friction portion 4 is provided on the outer surface of the barrel 2.

Since the pen tip 81 of the writing body 8 is projectable/retractable from/into the front-end hole 31 of the barrel 2 by operating the operation portion 5, the thermochromic writing instrument of the above first aspect of the invention can be quickly brought into a writing-capable state (pen-tip-projected state) or a stored state (pen-tip-retracted state) by one hand. Furthermore, in the above first aspect of the invention, by providing a friction portion 4 on the outer surface of the barrel 2, the handwriting of the thermochromic ink 83 can be easily changed in color by rubbing in a state that the barrel 2 is still held by one hand. Incidentally, in the above first aspect of the invention, it is sufficient to provide the above friction portion 4 at least a part of the outer surface of the barrel 2 (i.e., outer surface of the thermochromic writing instrument 1) and examples of the sites to which the above friction portion 4 is provided are the outer surface of the front end of the barrel 2, the outer surface of the rear end of the barrel 2, the outer surface of the side wall of the barrel 2, the outer surface of the clip projected from the outer surface of the barrel 2, the outer surface of the operation portion 5, which is projected from the outer surface of the barrel 2, for projecting/retracting the pen tip 81, and the like. In this connection, it is sufficient that at least one writing body is accommodated in a barrel 2 movably in a longitudinal direction. Examples thereof are, one writing body (8) being accommodated in a barrel 2 movably in a longitudinal direction or a plurality of writing bodies being accommodated in a barrel 2 movably in a longitudinal direction.

In the thermochromic writing instrument 1 of the above first aspect of the invention, a projection/retraction mechanism which projects/retracts the pen tip 81 by operating the operation portion 5 is provided in the barrel 2. The operation portion 5 is provided at the rear end of the barrel 2 and/or on the side wall of the barrel 2. In a state that the thermochromic writing instrument 1 is held by one hand, the operation portion 5 is operable by the hand. The preferable projection/retraction mechanism of the invention is that the operation portion 5 is provided at the rear end of the barrel 2 and the pen-tip-retracted state is shifted to the pen-tip-projected state by a forward press operation of the operation portion 5 against the backward urging force of the writing body 8 (so-called rear end knock type). However, as the projection/retraction mechanism of the invention, in addition thereto, there can be adopted that (a) the operation portion 5 is radially outwardly projected from the side wall of the barrel 2 and the pen-tip-retracted state is shifted to the pen-tip-projected state by a forward press operation of the operation portion 5 against the backward urging force (so-called side slide type), (b) the operation portion 5 is radially outwardly projected from the side wall of the barrel 2 and the pen-tip-retracted state is shifted to the pen-tip-projected state by an inward press operation of the operation portion 5 in a radial direction (so-called side knock type), (c) the pen tip 81 is projected/retracted by rotating the operation portion 5 provided at the rear part of the barrel 2 against the front portion of the barrel 2 (so-called rotation type), or the like.

[2] According to second aspect of the invention, there is provided the thermochromic writing instrument according to [1], wherein the friction portion 4 is provided at the front end of the barrel 2 so that a front end of the friction portion 4 is located ahead of the front end of the pen tip 81 in the pen tip-retracted state and the front end of the pen tip 81 is located ahead of the front end of the friction portion 4 in the pen tip-projected state.

The thermochromic writing instrument 1 of the second aspect of the invention enables a smooth writing with avoiding the contact of the friction portion 4 with a surface to be written in the pen-tip-projected state. Moreover, since the thermochromic writing instrument 1 of the second aspect of the invention enables rubbing of the handwriting with the friction portion 4 provided at the front end of the barrel 2 in the pen-tip-retracted state, it is unnecessary to re-hold the barrel 2 after writing and hence a user can quickly move to a rubbing-to-change-color operation.

[3] According to third aspect of the invention, there is provided the thermochromic writing instrument according to [2], wherein a pen tip-supporting portion of the barrel 2 having the front-end hole 31 is made of a hard material and a friction portion 4 made of a soft material is provided on an outer surface of the front end of the pen tip-supporting portion of the barrel 2.

In the thermochromic writing instrument 1 of the third aspect of the invention, since the pen-tip-supporting portion 3 is made of the hard material, in a state that the pen tip 81 is projected outside from the front-end hole 31 of the barrel 2 (at the time of writing), the outer surface of the pen tip 81 or the outer surface of the vicinity of the pen tip 81 of the writing body 8 is supported by the inner surface of the front-end hole 31 of the pen-tip-supporting portion 3 made of the hard material. Thereby, the stagger of the pen tip 81 is suppressed and a stable write feeling is obtained. Moreover, by forming the friction portion 4 made of a soft material on the outer surface of the front end of the pen-tip-supporting portion 3 made of the hard material, at changing the color of the handwriting by rubbing, the stagger of the friction portion 4 is suppressed and a stable rubbing-to-change-color operation is enabled.

[4] According to the fourth aspect of the invention, there is provided the thermochromic writing instrument according to [2], wherein the friction portion 4 and the writing body 8 are maintained in a non-contact state.

In the thermochromic writing instrument 1 of the fourth aspect of the invention, since the friction portion 4 and the writing body 8 (i.e., the pen tip 81 and the outer surface of the vicinity of the pen tip 81 of the writing body 8) are maintained in a non-contact state, the stain of the friction portion 4 by the attachment of the ink can be prevented and also a smooth pen tip projection/retraction performance is obtained.

[5] According to the fifth aspect of the invention, there is provided the thermochromic writing instrument according to [2], wherein the outer periphery 41 of the front end of the friction portion 4 has a convex curved surface or an inclined surface.

Thereby, in the thermochromic writing instrument 1 of the fifth aspect of the invention, any sharp corner portion is not formed in the front end outer periphery and thus a smooth contact of the friction portion 4 with a surface to be written becomes possible during rubbing-to-change-color operation. Also, it becomes easy to generate frictional heat since a proper contact area is obtained between the friction portion 4 and the surface to be written. In this connection, the inclined surface refers to a surface inclined to the axial line (tapered surface).

[6] According to the sixth aspect of the invention, there is provided the thermochromic writing instrument according to [2], wherein an angle defined between a contact line which contacts with the outer surface of the friction portion 4 and the front end of the pen tip 81 in the pen tip-projected state and an axial line is set to 10 degree or more and 60 degree or less.

Thereby, in the thermochromic writing instrument 1 of the sixth aspect of the invention, a proper rubbing-to-change-color operation performance of the friction portion 4 is obtained and also, in the pen-tip-projected state (at the time of writing), the pen tip 81 can be easily visualized and the non-contact state between the friction portion 4 and the surface to be written is maintained.

[7] According to the seventh aspect of the invention, there is provided the thermochromic writing instrument according to [2], wherein the friction portion 4 is provided circularly.

Thereby, in the thermochromic writing instrument 1 of the seventh aspect of the invention, it becomes unnecessary to confirm the direction of the friction portion 4 in a circumferential direction before rubbing using the friction portion 4 and thus the rubbing-to-change-color operation can be quickly started.

[8] According to an eighth aspect of the invention, there is provided the thermochromic writing instrument according to [2], wherein the operation portion 5 is provided at a rear end of the barrel 2 and the thermochromic writing instrument further includes a projection/retraction mechanism which shifts the pen tip 81 from the pen tip-retracted state to the pen tip-projected state by a forward press operation of the operation portion 5.

Thereby, in the thermochromic writing instrument 1 of the eighth aspect of the invention, it is unnecessary to reverse the barrel 2 so as to shift the holding part of the barrel 2 from the pen tip side to the rear end side and re-hold the barrel 2, so that it is possible to quickly perform a pen tip projecting operation.

[9] According to a ninth aspect of the invention, there is provided the thermochromic writing instrument according to [2], wherein the operation portion 5 is radially outwardly projected from a side wall of the barrel 2 and the thermochromic writing instrument further includes a projection/retraction mechanism which shifts the pen tip 81 from the pen tip-retracted state to the pen tip-projected state by a forward press operation of the operation portion 5.

Thereby, in the thermochromic writing instrument 1 of the ninth aspect of the invention, it is unnecessary to reverse the barrel 2 so as to shift the holding part of the barrel 2 from the pen tip side to the rear end side and re-hold the barrel 2, so that it is possible to quickly perform a pen tip projecting operation.

[10] According to a tenth aspect of the invention, there is provided the thermochromic writing instrument according to [2], wherein the operation portion 5 is radially outwardly projected from a side wall of the barrel 2 and the thermochromic writing instrument further includes a projection/retraction mechanism which shifts the pen tip 81 from the pen tip-retracted state to the pen tip-projected state by an radially inward press operation of the operation portion 5.

Thereby, in the thermochromic writing instrument 1 of the tenth aspect of the invention, it is unnecessary to reverse the barrel 2 so as to shift the holding part of the barrel 2 from the pen tip side to the rear end side and re-hold the barrel 2, so that it is possible to quickly perform a pen tip projecting operation.

[11] According to an eleventh aspect of the invention, there is provided the thermochromic writing instrument according to [2], wherein the operation portion 5 is provided at the rear part of the barrel 2 and the thermochromic writing instrument further includes a projection/retraction mechanism projecting and retracting the pen tip 81 by a rotation operation of the operation portion 5 against the front part of the barrel 2.

Thereby, in the thermochromic writing instrument 1 of the eleventh aspect of the invention, it is unnecessary to reverse the barrel 2 so as to shift the holding part of the barrel 2 from the pen tip side to the rear end side and re-hold the barrel 2, so that it is possible to quickly perform a pen tip projecting operation.

[12] According to a twelfth aspect of the invention, there is provided the thermochromic writing instrument according to [1], wherein the friction portion 4 is provided at a rear end of the barrel 2.

Thereby, in the thermochromic writing instrument 1 of the twelfth aspect of the invention, the handwriting of the thermochromic ink 83 can be rubbed with the friction portion 4 even in the pen-tip-projected state.

[13] According to a thirteenth aspect of the invention, there is provided the thermochromic writing instrument according to 1, wherein the operation portion 5 is provided at the rear end of the barrel 2, the thermochromic writing instrument further includes a projection/retraction mechanism which shifts the pen tip 81 from the pen tip-retracted state to the pen tip-projected state by a forward press operation of the operation portion 5 toward the front end of the barrel 2, the friction portion 4 is provided at an outer surface of the rear end of the operation portion 5 and a holding portion 51 capable of being held when rubbing with the friction portion 4 is provided on the outer peripheral surface of the operation portion 5.

In the thermochromic writing instrument 1 of the thirteenth aspect of the invention, a stable holding is enabled during rubbing-to-change-color operation by providing a holding portion 51 capable of holding at rubbing by using the friction portion 4, on the outer peripheral surface of the operation portion 5. For the holding portion 51, it is effective to set the length in an axial direction to 10 mm or more, preferably 15 mm or more. Furthermore, in the thermochromic writing instrument 1 of the thirteenth aspect of the invention, anti-slip effect of a finger is achieved at the forward press operation of the operation portion 5 by providing the friction portion 4 made of a soft material to the outer surface of the rear end of the operation portion 5.

[14] According to a fourteenth aspect of the invention, there is provided the thermochromic writing instrument according to 1, wherein the operation portion 5 is provided at the rear part of the barrel 2, the thermochromic writing instrument further includes a projection/retraction mechanism which shifts the pen tip 81 from the pen tip-retracted state to the pen tip-projected state by a rotation operation of the operation portion 5 against the front part of the barrel 2, the friction portion 4 is provided at the outer surface of the rear end of the operation portion 5 and a holding portion 51 capable of being held when rubbing with the friction portion 4 is provided on the outer peripheral surface of the operation portion 5.

In the thermochromic writing instrument 1 of the fourteenth aspect of the invention, a stable holding is enabled during rubbing-to-change-color operation by providing a holding portion 51 capable of holding at rubbing by using the friction portion 4, on the outer peripheral surface of the operation portion 5. For the holding portion 51, it is effective to set the length in an axial direction to 10 mm or more, preferably 15 mm or more.

[15] According to a fifteenth aspect of the invention, there is provided the thermochromic writing instrument according to [12], wherein the operation portion 5 is projected radially outward from a side wall of the barrel 2 and the thermochromic writing instrument further includes a projection/retraction mechanism which shifts the pen tip 81 from the pen tip-retracted state to the pen tip-projected state by a forward press operation of the operation portion 5.

In the thermochromic writing instrument 1 of the fifteenth aspect of the invention, the operation portion 5 can be provided independent of the friction portion 4 and thus the appearance and size of the operation portion 5 can be freely designed.

[16] According to a sixteenth aspect of the invention, there is provided the thermochromic writing instrument according to [12], wherein the operation portion 5 is radially outwardly projected from the side wall of the barrel 2 and the thermochromic writing instrument further includes a projection/retraction mechanism which shifts the pen tip 81 from the pen tip-retracted state to the pen tip-projected state by a radially inward press operation of the operation portion 5.

In the thermochromic writing instrument 1 of the sixteenth aspect of the invention, the operation portion 5 can be provided independent of the friction portion 4 and thus the appearance and size of the operation portion 5 can be freely designed.

[17] According to a seventeenth aspect of the invention, there is provided the thermochromic writing instrument according to 1, wherein a friction portion-operation portion 2d is provided on the outer surface of the barrel 2 and the friction portion 4 is adapted to be projectable/retractable from/into the rear end of the barrel 2 by operating the friction portion-operation portion 2d.

In the thermochromic writing instrument 1 of the seventeenth aspect of the invention, during rubbing, the friction portion 4 can be projected from the rear end of the barrel 2 and used for rubbing. On the other hand, during non-rubbing and storage, the friction portion 4 can be retracted into the barrel 2 to prevent the friction portion 4 from staining. In this connection, examples of the friction-portion-operation portion 2d include a rotation operation type against the barrel 2 or a sliding operation type against the barrel 2.

[18] According to an eighteenth aspect of the invention, there is provided the thermochromic writing instrument according to [1], wherein the friction portions 4 are provided at the front end of the barrel 2 and the rear end of the barrel 2, the front end of the friction portion 4 provided at the front end of the barrel 2 is located ahead of the front end of the pen tip 81 in the pen tip-retracted state and the front end of the pen tip 81 is located ahead of the front end of the friction portion 4 provided at the front end of the barrel 2 in the pen tip-projected state.

In the thermochromic writing instrument 1 of the eighteenth aspect of the invention, in the pen-tip-projected state, it can be avoided that the friction portion 4 provided at the front end of the barrel 2 comes into contact with the surface to be written, and thus a smooth writing is enabled. Moreover, in the thermochromic writing instrument 1 of the eighteenth aspect of the invention, in the pen-tip-retracted state, since the handwriting can be rubbed with the friction portion 4 provided at the front end of the barrel 2, it is unnecessary to reverse the barrel 2 after writing and thus a user can quickly move to the rubbing-to-change-color operation. Moreover, In the thermochromic writing instrument 1 of the eighteenth aspect of the invention, even in the pen-tip-projected state, the handwriting of the thermochromic ink 83 can be rubbed with the friction portion 4 provided at the rear end of the barrel 2.

[19] According to a nineteenth aspect of the invention, there is provided the thermochromic writing instrument according to [1], wherein a plurality of the writing bodies 8 are accommodated in the barrel 2 movably in a longitudinal direction, each of the pen tip 81s of the plurality of the writing bodies 8 is adapted to be alternatively projectable/retractable from/into the front-end hole 31 of the barrel 2, and the handwritings derived from the respective thermochromic ink 83 ejected from the pen tip 81 of each of the writing bodies 8 is rubbed with the friction portion 4 provided on the outer surface of the barrel 2, and each of the handwriting is capable of being thermally changed in color by the frictional heat generated at the rubbing.

In the thermochromic writing instrument 1 of the nineteenth aspect of the invention, plural (at least two) the handwritings derived from the thermochromic ink 83 can be obtained with one writing instrument. Moreover, in the thermochromic writing instrument 1 of the nineteenth aspect of the invention, since the handwriting of the thermochromic ink 83 ejected from the pen tip 81 of each of the writing bodies 8 can be thermally changed in color with the friction portion 4, the handwriting of the thermochromic ink 83 by each of the writing bodies 8 can be thermally changed in color at once with the friction portion 4.

[20] According to a Twentieth Aspect of the Invention

20. The thermochromic writing instrument according to [1], wherein a plurality of the writing bodies 8 are accommodated in the barrel 2 movably in a longitudinal direction, each of the pen tip 81 of the plurality of the writing bodies 8 is adapted to be alternatively projectable/retractable from/into the front-end hole 31 of the barrel 2, a detachable cap 11 is provided at the front end of the barrel 2, the cap 11 tightly seals the front-end hole 31 of the barrel 2 when the cap 11 is mounted to the front end of the barrel 2, and the handwritings derived from the respective thermochromic ink 83 ejected from the pen tip 81 of each of the writing bodies 8 is rubbed with the friction portion 4 provided on the outer surface of the barrel 2, and each of the handwritings is capable of being thermally changed in color by the frictional heat generated at the rubbing.

In the thermochromic writing instrument 1 of the twentieth aspect of the invention, plural (at least two) the handwriting of the thermochromic ink 83 can be obtained with one writing instrument. Moreover, in the thermochromic writing instrument 1 of the twentieth aspect of the invention, since the handwriting of the thermochromic ink 83 ejected from the pen tip 81 of each of the writing bodies 8 can be thermally changed in color with the friction portion 4, the handwriting of the thermochromic ink 83 by each of the writing bodies 8 can be thermally changed in color at once with the friction portion 4. Moreover, in the thermochromic writing instrument 1 of the twentieth aspect of the invention, since the cap 11 tightly seals the front-end hole 31 of the barrel 2 when the cap 11 is mounted to the front end of the barred 2, vaporization of the ink from the pen tip 81 of each of the writing bodies 8 can be prevented during non-writing.

[21] According to a twenty-first aspect of the invention, there is provided the thermochromic writing instrument according to [20], wherein a seal portion 101 closely sliding on the outer surface of each of the writing bodies 8 is provided in the barrel 2 and the pen tip 81 of each of the writing bodies 8 is tightly sealed between the seal portion 101 and the cap 11 when the cap 11 is mounted to the front end of the barrel 2.

In the thermochromic writing instrument 1 of the twenty-first aspect of the invention, when the cap 11 is mounted to the front end of the barrel 2, a tightly sealed space can be formed between the seal portion 101 and the cap 11 and thus the respective pen tips 81 of each of the writing bodies 8 can be surely tightly sealed during non-writing.

[22] According to a twenty-second aspect of the invention, there is provided the thermochromic writing instrument according to [21], wherein a biasing member 7 urging each of the writing bodies 8 backward is housed in the barrel 2, a biasing-member-supporting portion 2b supporting the rear end of each of the biasing members 7 is provided in the barrel 2, and a seal body 10 having the seal portion 101 is fixed to the biasing-member-supporting portion 2b.

In the thermochromic writing instrument 1 of the twenty-second aspect of the invention, since the seal body 10 having the seal portion 101 is fixed to the biasing-member-supporting portion 2b, the seal body 10 is surely fixed thereto.

[23] According to a twenty-third aspect of the invention, there is provided the thermochromic writing instrument according to [19], wherein color in a color-appeared state of the thermochromic ink 83 contained in the inside of each of the writing bodies 8 is different from each other.

In the thermochromic writing instrument 1 of the twenty-third aspect of the invention, plural of the handwritings having different color in the color-appeared state, derived from the thermochromic ink 83 contained in the inside of each of the writing bodies 8, can be thermally changed in color at once by the frictional heat of the friction part 4. Moreover, in the thermochromic writing instrument 1 of the twenty-third aspect of the invention, even if individual handwritings of the thermochromic inks 83 are overlapped, each of the plural handwritings can be identified by the color in the differently color-appeared state.

[24] According to a twenty-fourth aspect of the invention, there is provided the thermochromic writing instrument according to 19, wherein a respective complete color-disappeared temperature of the thermochromic ink 83 contained in the inside of each of the writing bodies 8 is set from 25° C. to 95° C.

In the thermochromic writing instrument 1 of the twenty-fourth aspect of the invention, the plural handwritings derived from the thermochromic ink 83 of each of the writing bodies 8 can be surely thermally changed in color at once by the frictional heat of the friction part 4. If the color-change temperature of the thermochromic ink 83 of each of the writing bodies 8 is out of the above temperature range, there is a fear that the plural handwritings cannot be thermally changed in color at once by the frictional heat of the friction part 4.

[25] According to a twenty-fifth aspect of the invention, there is provided the thermochromic writing instrument according to [20], wherein a friction portion 4 capable of thermally changing the color of the handwriting of the thermochromic ink 83 by the frictional heat generated when the handwriting is rubbed with the friction portion 4 is provided on an outer surface of the cap.

In the thermochromic writing instrument 1 of the twenty-fifth aspect of the invention, by providing the friction portion 4 on the outer surface of the cap 11, the friction portion 4 on the outer surface of the cap 11 can be used in the state that the cap 11 is mounted to the rear end of the barrel 2, in the state that the cap is separated from the barrel 2, and in the state that the cap 11 is mounted on the pen tip side of the barrel 2. Namely, in the thermochromic writing instrument 1 of the twenty-fifth aspect of the invention, even in any state of the cap 11 against the barrel 2, the handwriting of the thermochromic ink 83 can be instantaneously thermally changed in color by rubbing after the use for writing.

[26] According to a twenty-sixth aspect of the invention, there is provided the thermochromic writing instrument according to [1], wherein a detachable cap 11 is provided at the front end of the barrel 2 and the cap 11 tightly seals the front-end hole 31 of the barrel 2 when the cap 11 is mounted to the front end of the barrel 2.

In the thermochromic writing instrument 1 of the twenty-sixth aspect of the invention, since the cap 11 tightly seals the front-end hole 31 of the barrel 2 when the cap 11 is mounted to the front end of the barrel 2, there is obtained a projectable/retractable thermochromic writing instrument capable of preventing the vaporization of the ink from the pen tip 81 during non-writing.

[27] According to a twenty-seventh aspect of the invention, there is provided the thermochromic writing instrument according to [26], wherein a friction portion 4 capable of thermally changing the color of the handwriting of the thermochromic ink 83 by the frictional heat generated when the handwriting is rubbed with the friction portion 4 is provided on the outer surface of the cap.

In the thermochromic writing instrument 1 of the twenty-seventh aspect of the invention, by providing the friction portion 4 on the outer surface of the cap 11, the friction portion 4 on the outer surface of the cap 11 can be used in the state that the cap 11 is mounted to the rear end of the barrel 2, in the state that the cap is separated from the barrel 2, and in the state that the cap 11 is mounted on the pen tip side of the barrel 2. Namely, in the thermochromic writing instrument 1 of the twenty-seventh aspect of the invention, even in any state of the cap 11 against the barrel 2, the handwriting of the thermochromic ink 83 can be instantaneously thermally changed in color by friction after the use for writing.

*Friction Portion

In the invention, as the soft material for the friction portion 4, a resin having elasticity (rubber, elastomer) is mentioned and examples thereof include silicone resins, SBS resin (styrene-butadiene-styrene copolymer), SEBS resin (styrene-ethylene-butadiene-styrene copolymer), fluorocarbon resins, chloroprene resin, nitrile resins, polyester-based resins, ethylene-propylene-diene rubber (EPDM), and the like. As the soft material for the friction portion 4, an elastic material having low abrasion property, which is hardly abraded when rubbing against a paper surface or the like, is more effective than a high abrasion elastic material (e.g., rubber eraser). The friction portion 4 may be integrally formed by two-color molding on the outer surface of the pen-tip-supporting portion 3 of the barrel 2, or may be formed by fixing (e.g., fitting, press fitting, screwing, or adhering) a separate component constituting the friction portion 4 to the pen-tip-supporting portion 3 of the barrel 2. Further, the friction portion 4 may be integrally formed with the holding portion 51 (grip portion) made of the soft member of the barrel 2.

*Barrel

The pen-tip-supporting portion 3 of the barrel 2 having the front-end hole 31 supports the outer surface of the pen tip 81 or the outer surface of the vicinity of the pen tip 81 of the writing body 8 in the pen-tip-projected state. The hard material for the pen-tip-supporting portion 3 includes synthetic resins (e.g., polycarbonate, polypropylene, polyacetal, polyethylene terephthalate, ABS resin, and the like), metals, or the like.

*Pen Tip

In the invention, examples of the pen tip 81 include ball-point pen tips, resin processed bodies of fiber bundles, thermally fused bodies of fiber bundles, felt processed bodies, pipe-shaped pen bodies, fountain pen-type plate-shaped pen bodies having a slit at the front end, brush pen bodies, synthetic resin porous bubble bodies, synthetic resin extruded bodies having an ink-guide in an axial direction, and the like. If the pen tip 81 is a ball-point pen tip, as a mechanism for preventing the pen tip from drying in the pen-tip-retracted state, it is effective that a pen tip ball is urged forward to press the ball to the inner surface of an inward caulked portion (front end rim portion) of the tip front end. If the pen tip 81 is other than the ball-point pen tip, as a mechanism for preventing the pen tip from drying in the pen-tip-retracted state, it is effective that the front-end hole 31 of the barrel 2 is closed to tightly seal the pen tip 81 in the pen-tip-retracted state within the barrel 2.

*Thermochromic Ink

In the invention, the thermochromic ink 83 is preferably a reversible thermochromic ink. The reversible thermochromic ink can be formed solely from or by combination of various types of ink, such as: ink of heat color-disappearing type whose color disappears from a color-appeared state when heated; ink of color storage and retention type that stores and retains a color-appeared state or a color-disappear state at a specific temperature range in an enantiotropic manner; and ink of a heat color-appearing type that develops color from a color-disappeared state when heated and that returns to a color-disappeared state from the color-appeared state when cooled.

Moreover, as a reversible thermochromic microcapsule pigment included in the reversible thermochromic ink, a reversible thermochromic microcapsule pigment is effective, which is formed by enclosing, in a microcapsule, a reversible thermochromic composition containing at least three known indispensable components thitherto known: (a) an electron-donating color-reactive organic compound; (b) an electron-accepting compound; and (c) a reactive medium that determines a generation temperature of color reaction of both compounds.

In the invention, it is preferable to apply a thermochromic ink of color storage and retention type. In this type ink, in a curve shape obtained by plotting a change in coloring density caused by the temperature change, as shown in FIG. 6, a path plotted when temperature is increased from a temperature lower than a color-change temperature range differs from a path plotted when temperature is decreased from a temperature higher than a color-change temperature range. Further, it is preferable that a color-appeared state achieved at low temperature range which is a complete color-appeared temperature ($t_1$) or lower or a color-disappeared state achieved at high temperature range which is a complete color-disappeared temperature ($t_4$) or higher can be stored and retained at a specific temperature range [range from $t_2$ to $t_3$ (an essentially two-phase retaining temperature range)]. In FIG. 6, ΔH designates a temperature range (i.e. the range of hysteresis) showing the degree of hysteresis. When a value of ΔH is small, only one state of the two states can be achieved. When the value of ΔH is large, retention of respective states achieved before and after changing the color becomes easy.

Although the essentially two-phase retaining temperature range can be set depending on the purposes, in the present invention, setting the high-temperature point of changing the color [complete color-disappeared temperature $(t_4)$] to the range of 25° C. to 95° C., preferably 36° C. to 90° C. and setting the low-temperature point of changing the color [complete color-appeared temperature $(t_1)$] to the range of −30° C. to +20° C., preferably −30° C. to 10° C. are effective. As a result, retention of color developed in a normal state (a temperature range for a daily activity) can be effectively performed and also the handwriting derived from the reversible thermochromic ink can be readily changed in color by frictional heat of the friction portion.

With regard to the reversible thermochromic microcapsule pigment, an average particle size of the pigment preferably falls within the range of 0.5 to 5.0 μm, preferably the range of 1 to 4 μm. If the average particle size exceeds 5.0 μm, effluence of the pigment from capillary gaps of the ball-point-pen tip and a marking pen tip is deteriorated. If the average particle size is less than 0.5 μm, high-density color development becomes difficult.

The reversible thermochromic microcapsule pigment can be formulated at 2 to 50 wt %, preferably 3 to 40 wt %, and more preferably 4 to 30 wt % relative to the total amount of ink composition. When the concentration is less than 2 wt %, coloring density becomes insufficient. In contrast, when the concentration exceeds 50 wt %, ink effluence is deteriorated and thus writing ability is hindered.

Advantage Of The Invention

The invention can provide a thermochromic writing instrument containing a thermochromic ink, which is capable of easily changing the color of the handwriting of thermochromic ink by rubbing and also being quickly brought into a writing-capable state or a stored state even when a user can use only one hand.

DESCRIPTION OF REFERENCE NUMERALS AND SIGNS

Figure 1:
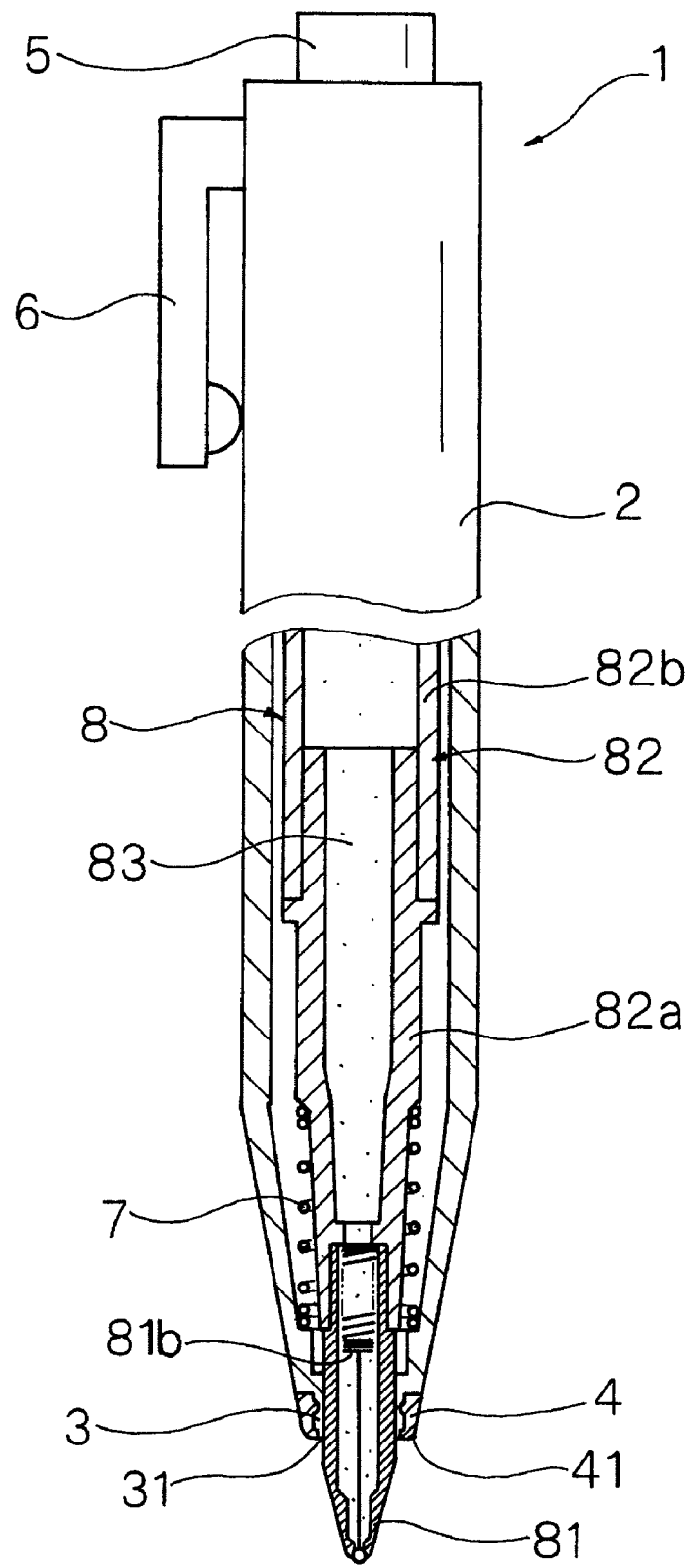
FIG. 1 is a partially broken longitudinal cross-sectional view showing a pen-tip-projected state of a first embodiment of the invention.

1 Thermochromic writing instrument
2 Barrel
2a Front barrel
2b Biasing-member-supporting portion
2c Rear barrel
2d Friction-portion-operation portion
21 Window hole
22 Latch wall portion
23 Abutting wall portion
3 Pen-tip-supporting portion
31 Front-end hole
4 Friction portion
41 Front-end outer peripheral rim
5 Operation portion
51 Holding portion
6 Clip
7 Biasing member
8 Writing body
81 Pen tip
81a Ball
81b Biasing member
82 Ink containing portion
82a Pen tip holder
82b Ink containing tube
83 Ink
84 Following body
85 Tail stopper
9 Operation body
91 Rear side projection portion
92 Front side projection portion
93 Fitting portion
94 Collar portion 10 Seal body
101 Seal portion
11 Cap

BEST MODE FOR CARRYING OUT THE INVENTION

<First Embodiment>

A first embodiment of the thermochromic writing instrument of the invention is shown in FIG. 1 to FIG. 5.

The thermochromic writing instrument 1 of this embodiment comprises a barrel 2 and a writing body 8 accommodated in the barrel 2 movably in a longitudinal direction.

*Barrel

The barrel 2 is obtained by injection molding of a hard material (e.g., polycarbonate resin). The front end of the barrel 2 is formed in a tapered shape. In the front end of the tapered front end (i.e., front end of the barrel 2), a front-end hole 31 is pierced in a longitudinal direction. Through the front-end hole 31, a pen tip 81 of the writing body 8 accommodated in the barrel 2 is projectable/retractable (i.e., projectable toward outside and retractable into the barrel 2). On the rear outer surface of the barrel 2, a clip 6 capable of being pinched in a pocket is provided in a protruding state. Moreover, a biasing member 7 (specifically, a compressed coil spring) always urging the writing body 8 backward is housed in the barrel 2. Since the barrel 2 has a front barrel and a rear barrel detachably screwed at the rear end of the front barrel, it is possible to remove the writing body 8 from the inside of the barrel 2 and replace the body 8.

*Pen-Tip-Supporting Portion

The front end of the barrel 2 having the front-end hole 31 serves as a pen-tip-supporting portion 3 which supports the radially outer surface of the pen tip 81 in a state that the pen tip 81 is projected outside from the front end of the barrel 2 (at the time of writing). Since the pen-tip-supporting portion 3 is formed integrally with the front end of the barrel 2, the portion 3 is made of the same hard material (e.g., polycarbonate resin) as that for the barrel 2.

*Friction Portion

A friction portion 4 made of a soft material (e.g., an elastic material having low abrasion property such as SBS resin or SEBS resin) is provided on the outer surface of the front end of the barrel 2 (i.e., the outer surface of the front end of the pen-tip-supporting portion 3).

The friction portion 4 is provided circularly on the outer peripheral surface of the front end of the pen-tip-supporting portion 3. Thereby, it becomes unnecessary to confirm the direction of the friction portion 4 in a circumferential direction before rubbing with the friction portion 4 and thus a rubbing-to-change-color operation can be quickly started. The shape of the friction portion 4 may not be circular (e.g., adaptable are a constitution wherein a plurality of the friction portions are dispersed in a circumferential direction, a constitution wherein the portion is formed at one position in a circumferential direction, or the like).

On the front-end outer peripheral rim 41 of the friction portion 4, a convex curved surface or an inclined surface is formed. Thereby, a smooth contact of the friction portion 4 with a surface to be written is enabled during rubbing-to-change-color operation. Also, it becomes easy to generate frictional heat since a proper contact area is obtained between the friction portion 4 and the surface to be written.

The inner surface of the friction portion 4 in a radial direction is located more radially outward than the inner surface of the front-end hole 31. Namely, the friction portion 4 is not projected more inward in a radial direction than the inner surface of the front-end hole 31. Therefore, at the time when the pen tip is projected/retracted, non-contact state of the friction portion 4 with the writing body 8 (specifically, the pen tip 81) accommodated in the barrel 2 is maintained. Thereby, the writing body 8 (specifically, the pen tip 81) does not come into contact with the friction portion 4 at the time when the pen tip 81 of the writing body 8 accommodated in the barrel 2 is projected/retracted and a smooth performance of projection/retraction of the pen tip 8 is obtained, as well as the friction portion 4 is not stained through the attachment of the ink.

The friction portion 4 is obtained by fixing (e.g., fitting, press fitting, screwing, or adhering) a separate component to the outer surface of the front end of the barrel 2. Alternatively, the friction portion 4 is obtained by two-color molding with the barrel 2.

*Projection/Retraction Mechanism

The barrel 2 contains a projection/retraction mechanism which projects/retracts the pen tip. In this embodiment, as the projection/retraction mechanism, a so-called rear end-knocking type is adopted. In the projection/retraction mechanism, by pressing forward an operation portion 5 projected backward from the rear end of the barrel 2, the writing body 8 is moved forward against the backward urging force to shift the pen-tip-retracted state into the pen-tip-projected state. Furthermore, in this embodiment, the pen-tip-projected state can be returned to the pen-tip-retracted state by pressing the operation portion 5 forward again.

*Writing Body

The writing body 8 has a pen tip 81 and an ink containing portion 82 having the pen tip 81 at the front end and containing a thermochromic ink 83 inside. The thermochromic ink 83 is ejected from the pen tip 81.

The pen tip 81 includes a ball-point pen tip having a ball 81a rotatably held at the front end. In the inside of the pen tip 81, a biasing member 81b pressing forward the ball 81a at the front end is housed. In the biasing member 81b, a rod portion is provided at the front end of the compressed coil spring and the front end of the rod portion is in contact with the rear surface of the ball 81a. During non-writing state, the ball is in close contact with the inner surface of inward caulked portion at the ball-point pen tip front end by the forward urging force of the biasing member 81b and thus leakage of the ink and vaporization of the ink from the front end of the pen tip 81 can be prevented.

The ink-containing portion 82 includes a pen tip holder 82a holding the pen tip 81 and an ink containing tube 82b having the pen tip holder 82a fixed to the front end. In the ink containing portion 82, the thermochromic ink 83 and a following body 84 disposed to the rear end of the ink 83 are housed.

As the thermochromic ink 83, there is adopted a reversible thermochromic ink wherein the low-temperature point of color-change (complete color-appeared temperature $t_1$) is set to the range of −30° C. to −10° C., the high-temperature point of color-change (complete color-faded temperature $t_4$) is set to the range of 60° C. to 80° C., and the range of hysteresis ΔH shows the range of 40° C. to 60° C. The thermochromic ink 83 becomes colorless in the color-faded state.

The following body 84 advances forward in association with consumption of the ink and prevents the backward movement (i.e., back-flow) of the ink. For example, a highly viscous fluid, a movable stopper made of an elastic material, a solid substance contained in a highly viscous fluid, or the like may be mentioned.

A tail stopper 85 having a ventilation hole is fitted to the rear end of the ink containing tube 82b.

*Angle α

In this embodiment, the angle a defined between a contact line contacts with the outer surface of the friction portion 4 and the front end of the pen tip 81 in the pen-tip-projected state and an axial line is set to 15 degree or more and 50 degree or less. Thereby, a proper rubbing-to-change-color operation performance of the friction portion 4 is obtained and also, during writing (in the pen-tip-projected state), the pen tip 81 can be easily visualized and the non-contact state between the friction portion 4 and the surface to be written is maintained.

Figure 2:
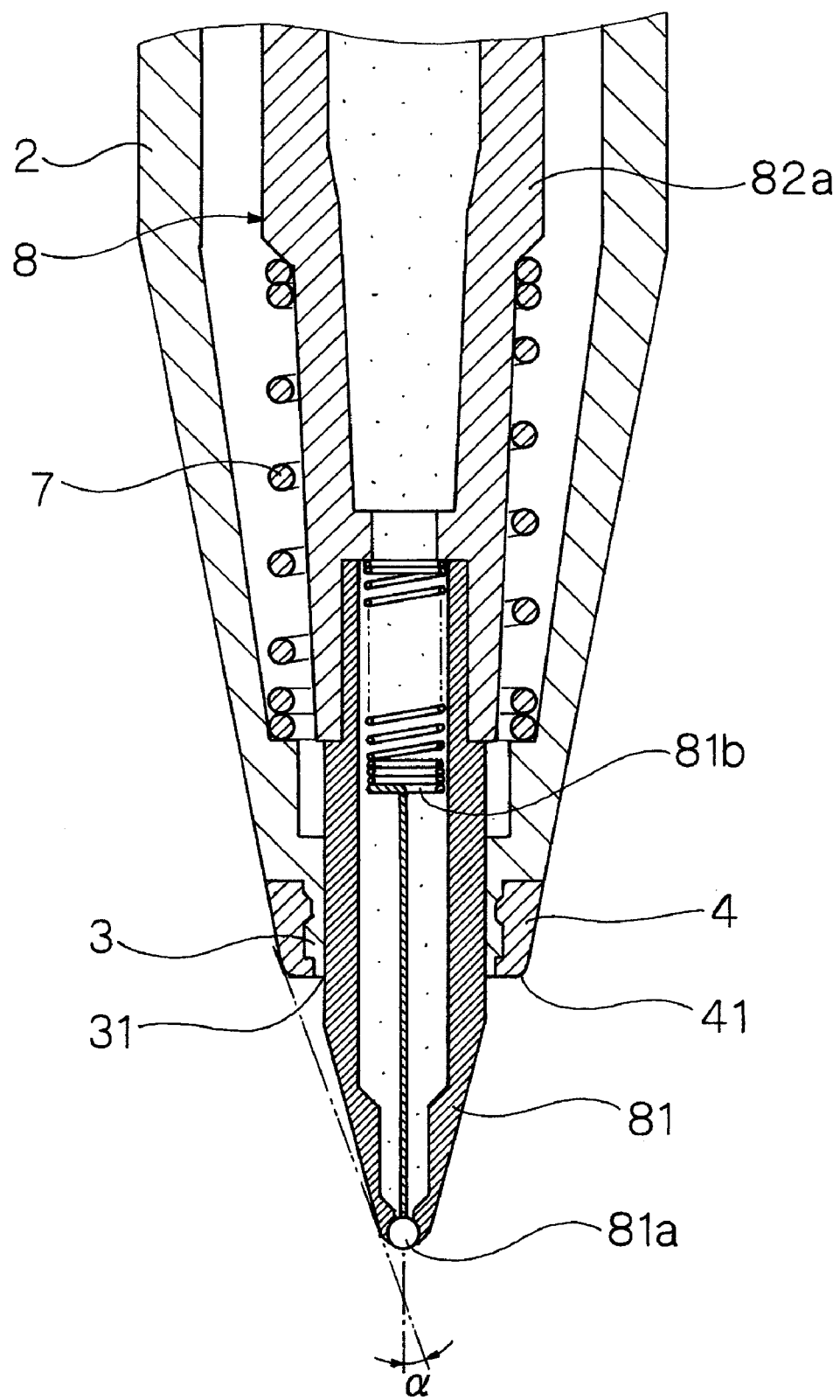
FIG. 2 is an enlarged longitudinal cross-sectional view of an essential part of FIG. 1.

*At Writing (See FIG. 1 and FIG. 2)

By holding the thermochromic writing instrument 1 of this embodiment with one hand and pushing the operation portion 5 forward, the pen-tip-retracted state can be quickly shifted into the pen-tip-projected state. By writing on a surface to be written such as paper surface with the pen tip in the pen-tip-projected state, the handwriting of the thermochromic ink 83 can be formed on the surface to be written.

Figure 3:
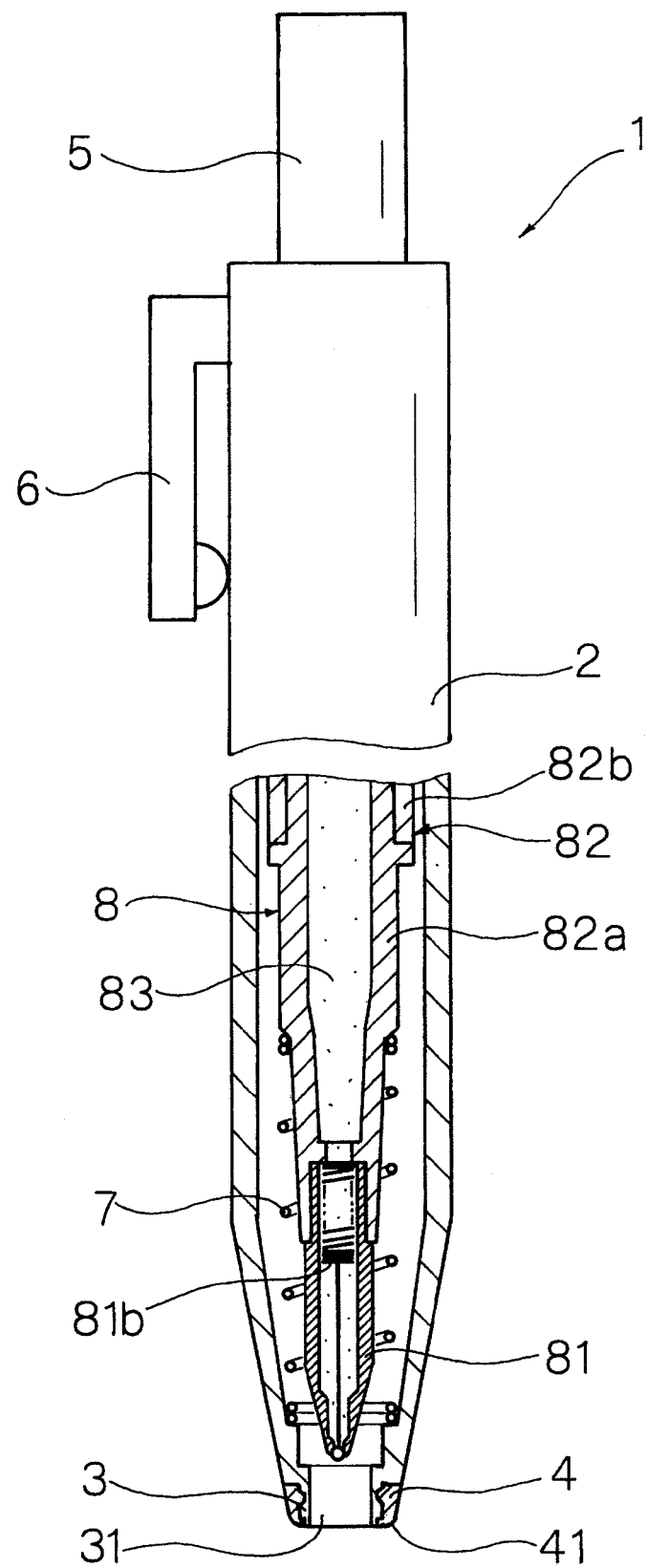
FIG. 3 is a partially broken longitudinal cross-sectional view showing a pen-tip-retracted state of a first embodiment of the invention.
Figure 4:
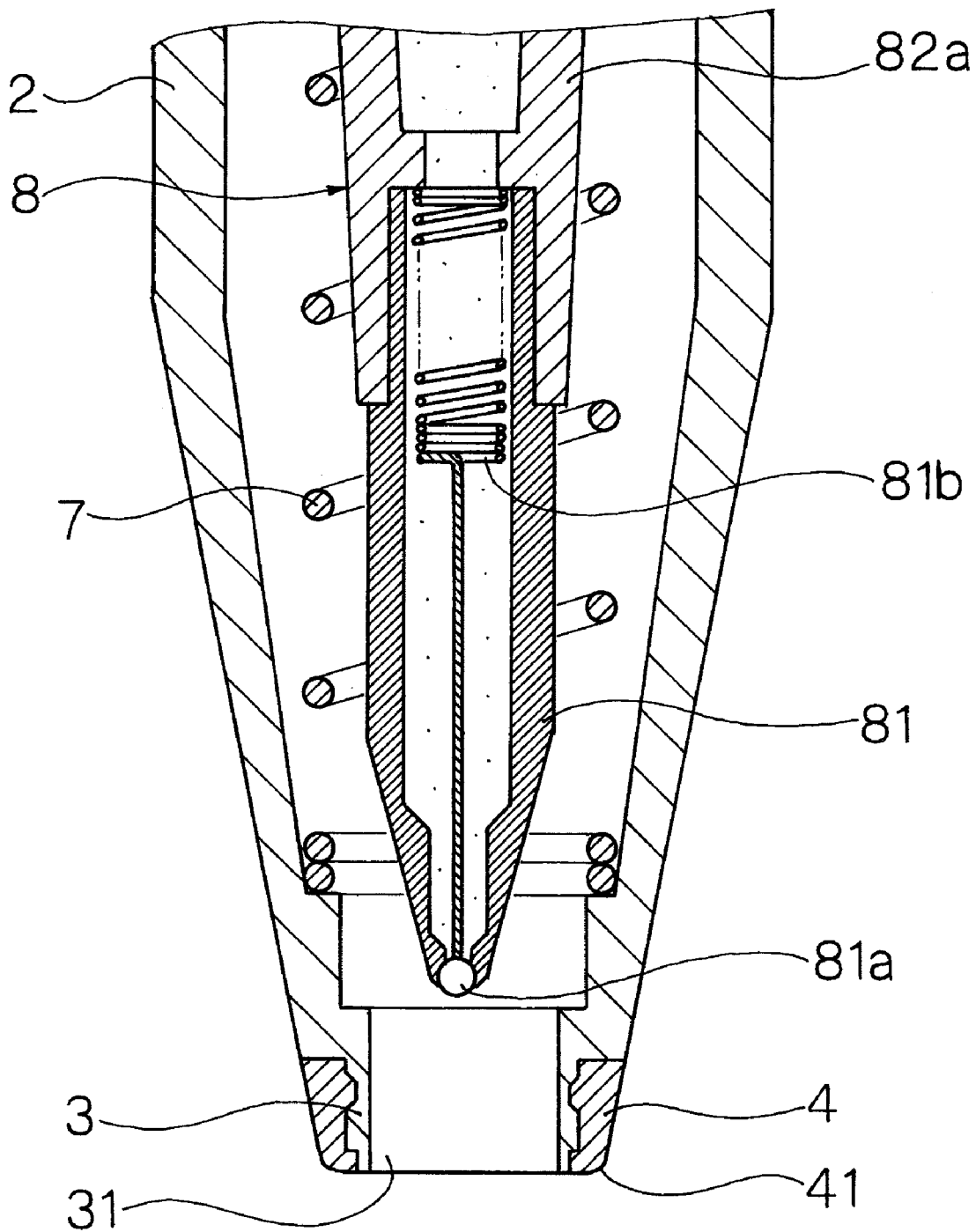
FIG. 4 is an enlarged longitudinal cross-sectional view of an essential part of FIG. 3.
Figure 5:
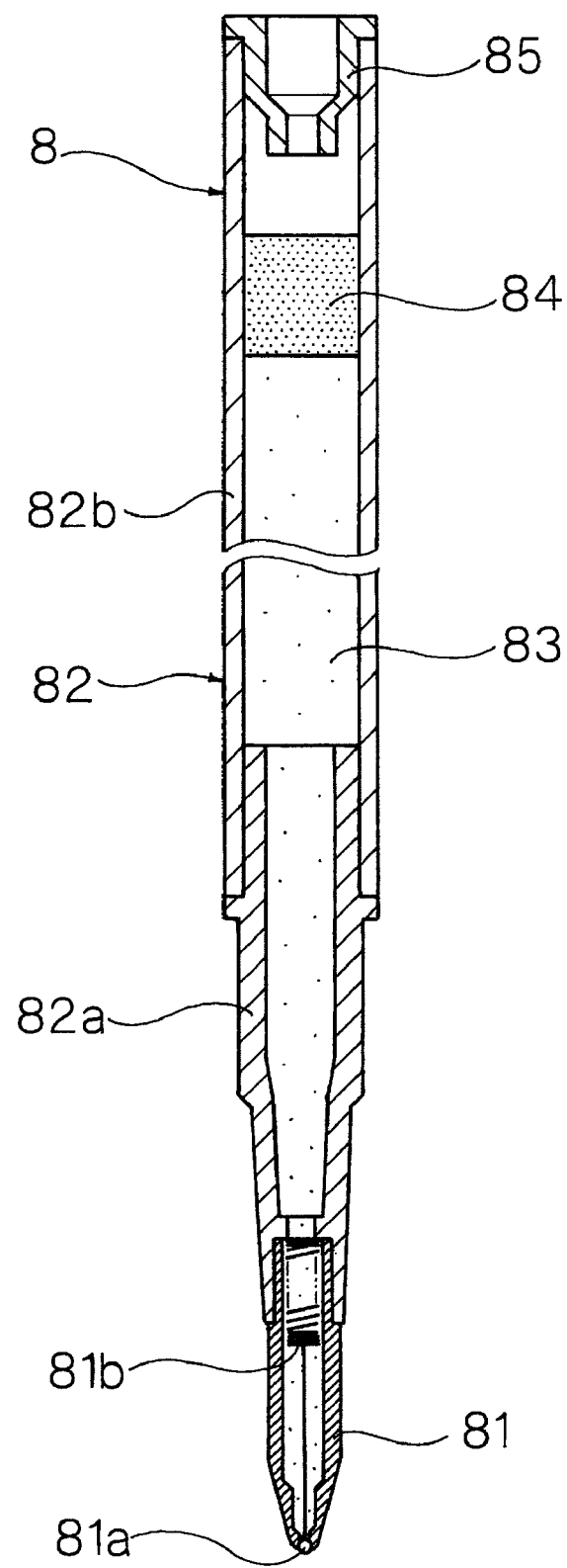
FIG. 5 is a longitudinal cross-sectional view of a writing body used in a first embodiment of the invention.
Figure 6:
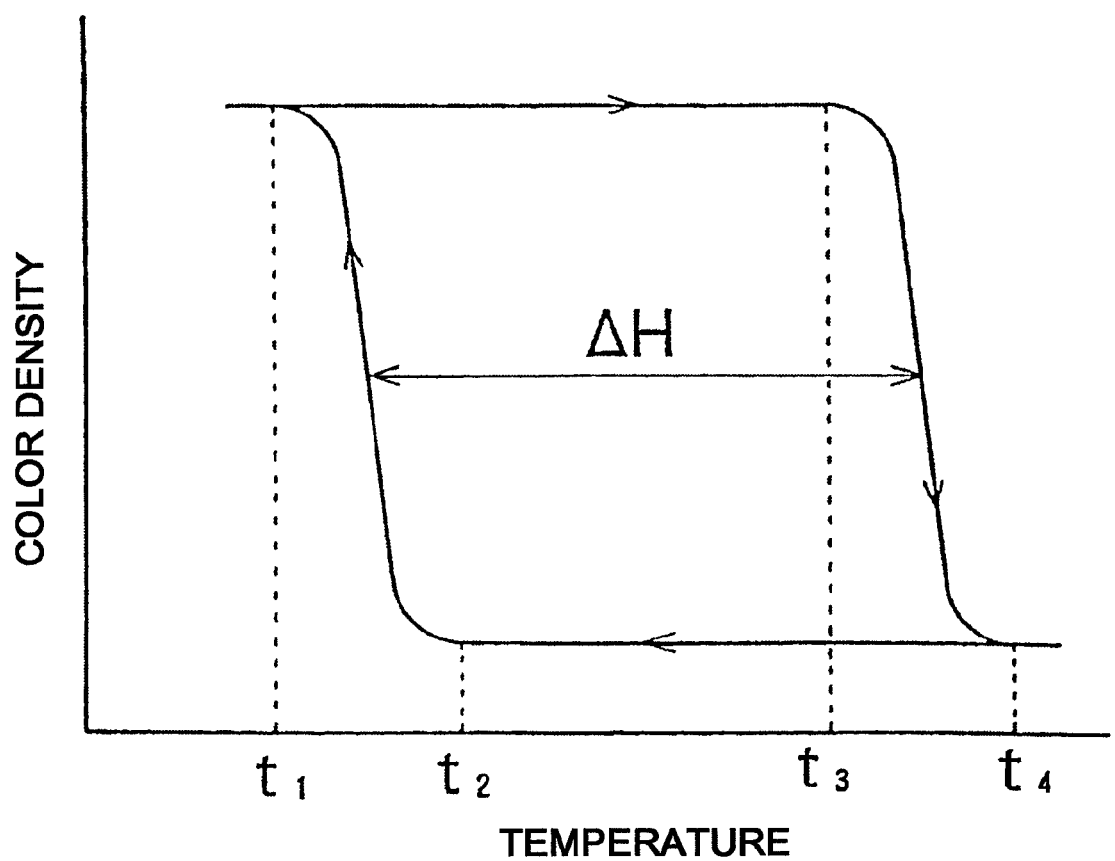
FIG. 6 is a descriptive view showing change-color behavior of a thermochromic ink.

*At Rubbing-to-Change-Color Operation (See FIG. 3 and FIG. 4)

After writing, in the state that the thermochromic writing instrument 1 is held with one hand, by pushing the operation portion 5 forward without re-holding the thermochromic writing instrument 1, the pen-tip-projected state can be quickly shifted into the pen-tip-retracted state. In the pen-tip-retracted state, using the friction portion 4, the handwriting of the thermochromic ink 83 formed on the surface to be written is rubbed and the handwriting can be thermally changed in color by the frictional heat generated at the rubbing.

<Second Embodiment>

Figure 7:
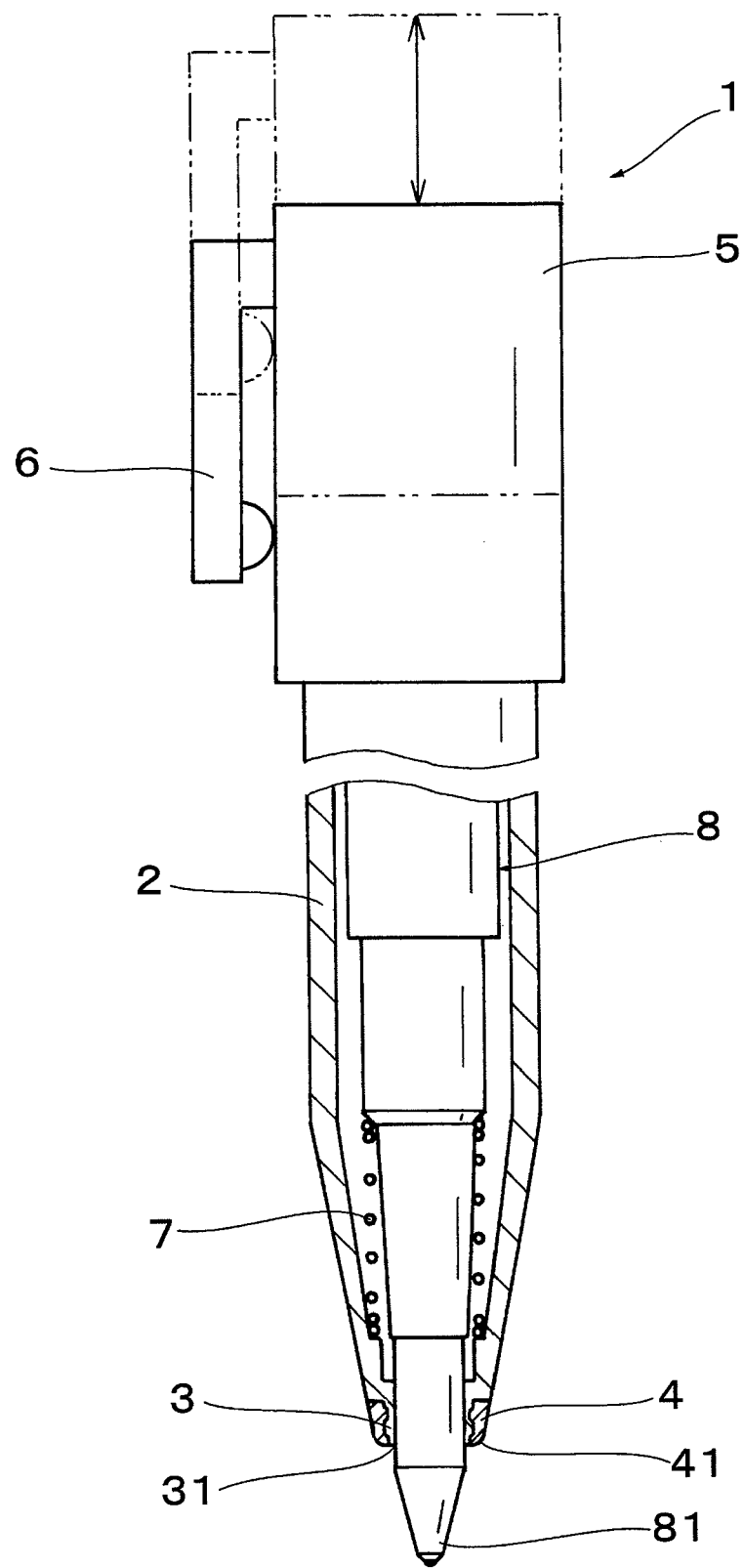
FIG. 7 is a partially broken longitudinal cross-sectional view showing a pen-tip-projected state of a second embodiment of the invention.

A second embodiment of the thermochromic writing instrument of the invention is shown in FIG. 7.

The thermochromic writing instrument 1 of this embodiment is a modified example of the first embodiment and a different point from the first embodiment is that a cylindrical operation portion 5 is provided on the outer peripheral surface of the rear end of the barrel 2 movably in a longitudinal direction. A clip 6 being pinched in a pocket or the like is provided on the outer surface of the operation portion 5 in a protruding manner.

In the second embodiment, since the other structure and advantages are common to the first embodiment, explanation thereof is omitted.

<Third Embodiment>

Figure 8:
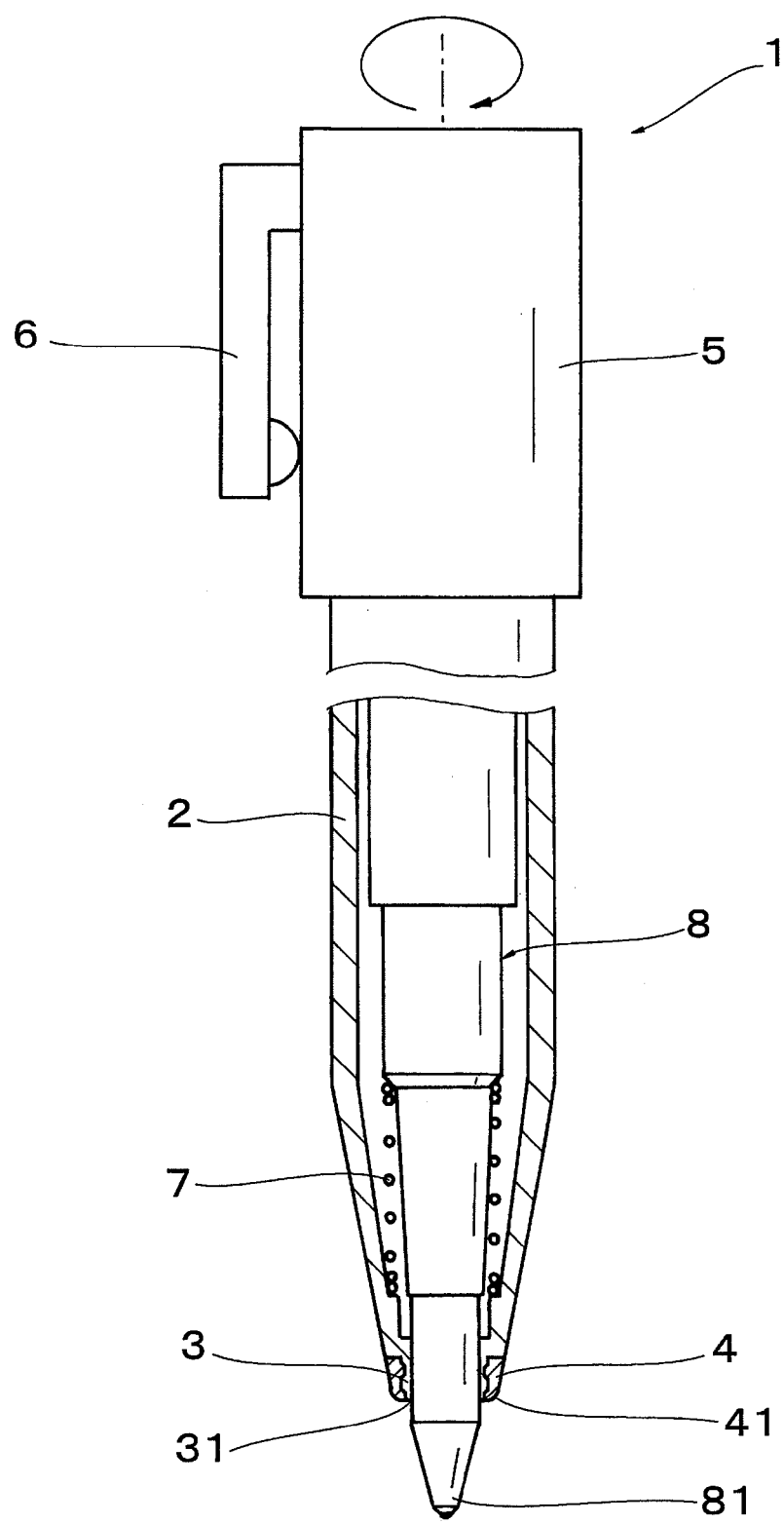
FIG. 8 is a partially broken longitudinal cross-sectional view showing a pen-tip-projected state of a third embodiment of the invention.

A third embodiment of the thermochromic writing instrument of the invention is shown in FIG. 8.

The thermochromic writing instrument 1 of this embodiment is a modified example of the first embodiment and a different point from the first embodiment is that an operation portion 5 is provided on the outer peripheral surface of the rear end of the barrel 2 rotatably against the barrel 2. A clip 6 being pinched in a pocket or the like is provided on the outer surface of the operation portion 5 in a protruding manner.

Namely, the projection/retraction mechanism of this embodiment is a so-called rotation type and the pen tip 81 is projected/retracted from the front-end hole 31 by a rotation operation of the operation portion 5 against the barrel 2.

In the third embodiment, since the other structure and advantages are common to the first embodiment, explanation thereof is omitted.

<Fourth Embodiment>

Figure 9:
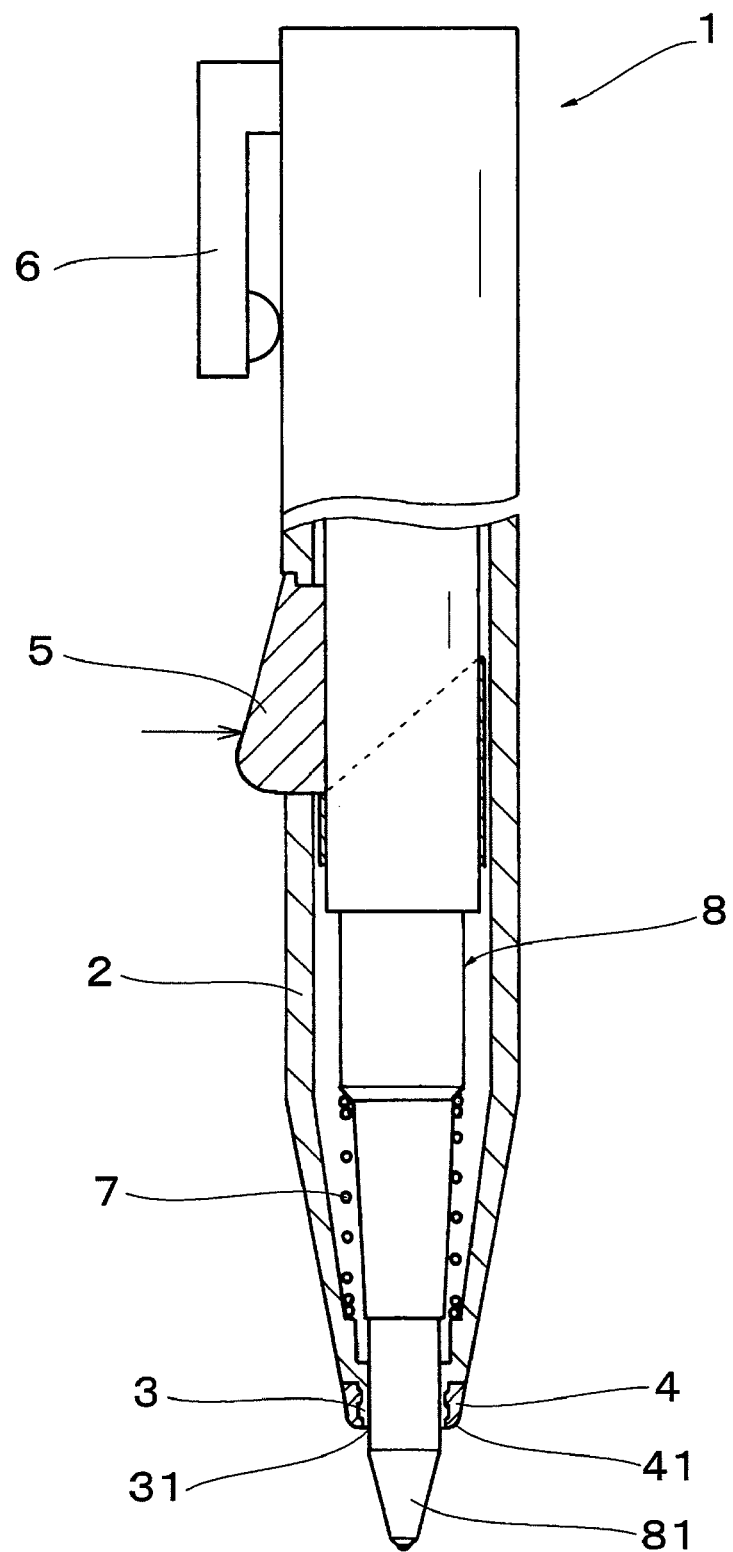
FIG. 9 is a partially broken longitudinal cross-sectional view showing a pen-tip-projected state of a fourth embodiment of the invention.

A fourth embodiment of the thermochromic writing instrument of the invention is shown in FIG. 9.

The thermochromic writing instrument 1 of this embodiment is a modified example of the first embodiment and a different point from the first embodiment is that an operation portion 5 is radially outwardly projected from a hole formed on the side wall of the barrel 2.

Namely, the projection/retraction mechanism of this embodiment is a so-called side-knock type and the pen tip 81 is projected/retracted from the front-end hole 31 by a radially inward press operation of the operation portion 5.

In the fourth embodiment, since the other structure and advantages are common to the first embodiment, explanation thereof is omitted.

<Fifth Embodiment>

Figure 10:
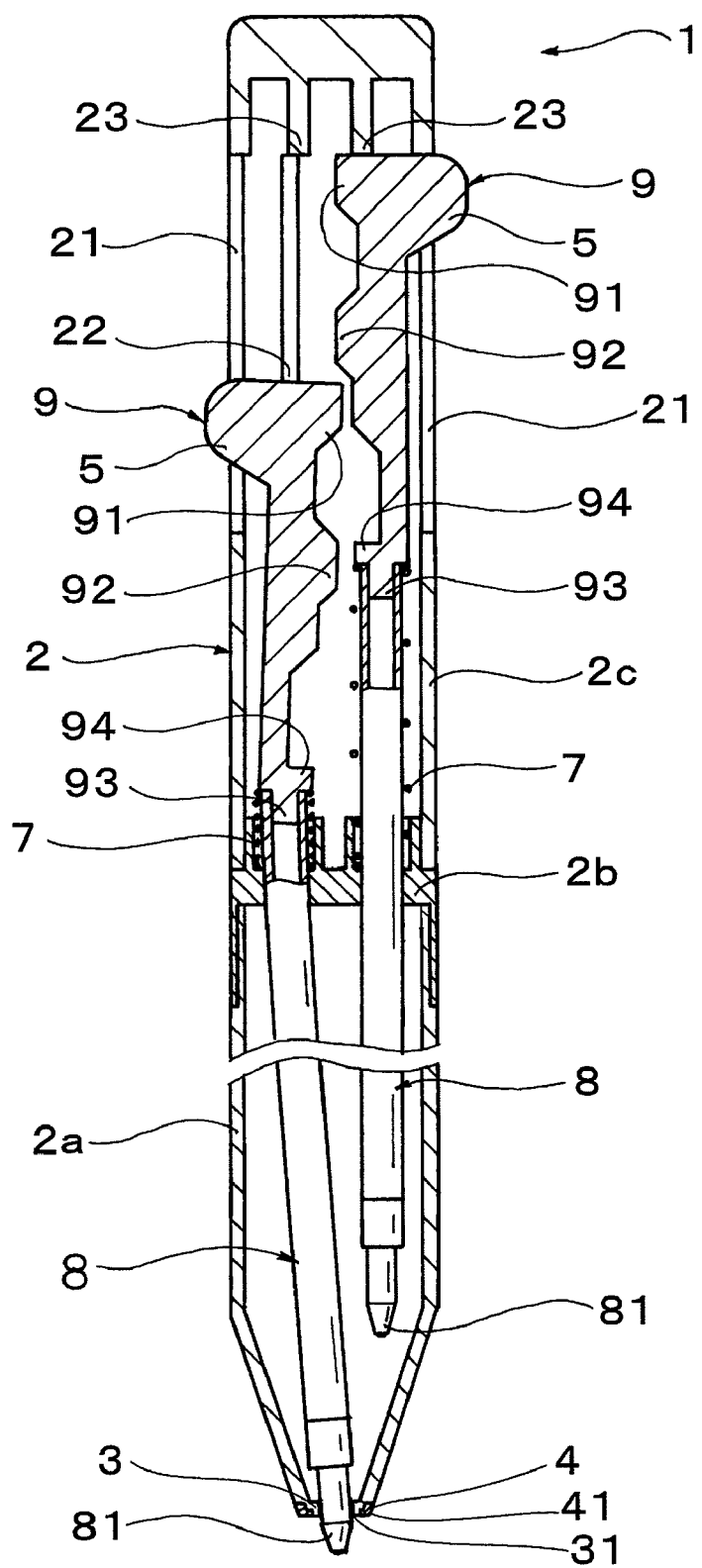
FIG. 10 is a partially broken longitudinal cross-sectional view showing a pen-tip-projected state of a fifth embodiment of the invention.
Figure 11:
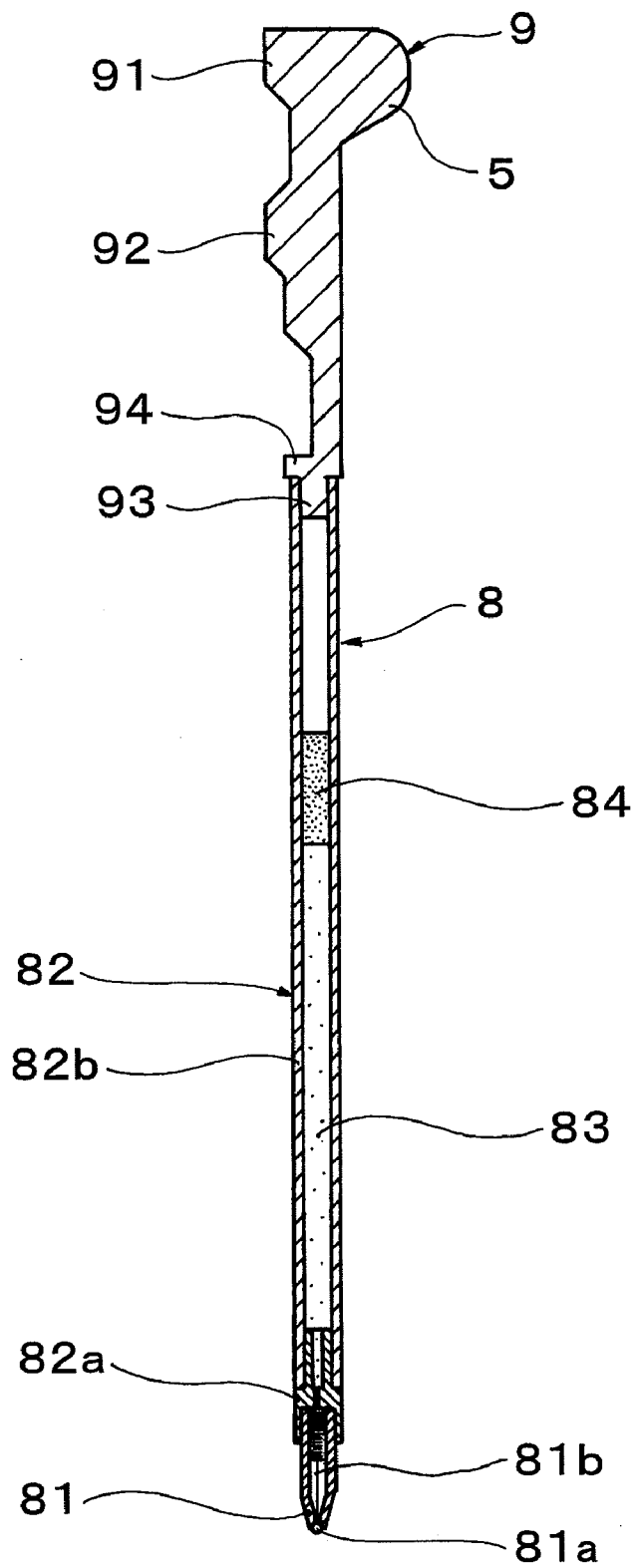
FIG. 11 is a longitudinal cross-sectional view of a writing body used in a fifth embodiment of the invention.

A fifth embodiment of the thermochromic writing instrument of the invention is shown in FIGS. 10 and 11.

The thermochromic writing instrument 1 of this embodiment includes the barrel 2 and a plurality of writing bodies 8 accommodated in the barrel 2 movably in a longitudinal direction.

In the barrel 2, each of the plurality of writing bodies 8 is accommodated movably in a longitudinal direction. Each of the writing bodies 8 is urged backward by the biasing member 7 (specifically, compressed coil spring).

In the barrel 2, a projection/retraction mechanism which projects/retracts the pen tip is contained. In this embodiment, as the projection/retraction mechanism, a so-called side-slide type is adopted. In the projection/retraction mechanism, the pen tip 81 is projected/retracted from the front-end hole 31 by a forward press operation of each operation portion 5 protruded radially outward from the side wall of the barrel 2 against the backward urging force of the biasing member 7.

The barrel 2 includes a front barrel 2a which is a tapered cylindrical body, a cylindrical biasing-member-supporting portion 2b attached by screwing or press-fitting with the rear end of the front barrel 2a, and a cylindrical rear barrel 2c attached by screwing or press-fitting with the rear end of the biasing-member-supporting portion 2b.

At the front end of the front barrel 2a, the front-end hole 31, from which each of the writing bodies 8 can be alternatively projected, is pierced in an axial direction.

At the side wall of the rear part of the rear barrel 2c, a plurality of (two in this embodiment) long window holes 21 are pierced in a radial direction. These long window holes 21 extend in a longitudinal direction, and the number of the long window holes corresponds to the number of the writing bodies 8 accommodated in the barrel 2.

Moreover, a latch wall portion 22 which is a rib extending in a longitudinal direction is formed at the inner surface of the side wall which is defined between individual window holes 21 of the rear barrel 2c. When the pen tip 81 is projected, the rear end of the operation body 9 corresponding to the projected pen tip 81 is fitted at the latch wall portion 22. At the inner surface of the rear end wall of the rear barrel 2c, an abutting wall portion 23 is formed and the rear end of the operation body 9 corresponding to the retracted pen tip 81 is fitted at the abutting wall portion 23 when the pen tip 81 is retracted.

Each of the writing bodies 8 is a ball-point pen refill and includes the pen tip 81 having a ball 81a rotatably held at the front end and an ink containing tube 82b having the pen tip 81 at the front end and an opening at the rear end. The ink containing tube 82b contains therein a thermochromic ink made of an aqueous gel having a shear thinning property. At the rear end of the thermochromic ink 83 in the ink containing tube 82b, a following body 8 made of a highly viscous fluid which advances forward in association with consumption of the ink is placed.

Each of the writing bodies 8 includes a ball-point pen tip having a ball 81a rotatably held at the front end. Inside of each pen tip 81, a biasing member 81*b* pressing forward the ball 81*a* at the front end is housed. In the biasing member 81*b*, a rod portion is provided at the front end of the compressed coil spring and the front end of the rod portion is in contact with the rear surface of the ball 81*a*. During not-writing, the ball 81*a* is in close contact with the inner surface of inward front-end rim portion of the front end of the ball-point pen tip by the forward urging force of the biasing member 81*b*. Thus, leakage of the ink and vaporization of the ink from the front end of each pen tip 81 can be prevented. Moreover, the pen tip 81 may be directly attached to the front-end opening of the ink containing tube 82*b*. However, in this embodiment, the pen tip 81 is fixed to the front-end opening of the ink containing tube 82*b* via a pen tip holder 82*a*.

As each of the thermochromic inks 83, there is adopted a reversible thermochromic ink in which the low-temperature point of color-change (complete color-appeared temperature $t_1$) is set to the range of −30° C. to −10° C., the high-temperature point of color-change (complete color-faded temperature $t_4$) is set to the range of 60° C. to 80° C., and the range of hysteresis ΔH is 40° C. to 60° C. Each of the thermochromic inks 83 shows, for example, black, blue, red, yellow, green, orange, purple, dark blue, pink, light blue, or the like color in the color-appeared state. Each of the thermochromic inks 83 becomes colorless in the color-faded state. Each of the thermochromic inks 83 shows different color in the color-appeared state.

The operation body 9 is attached to the rear end of each of the writing bodies 8.

The each operation body 9 has: the operation portion 5 formed at the rear end and projecting outside from the window hole 21 of the barrel 2; a rear side projection portion 91 provided on the opposite side to the operation portion 5; a front side projection portion 92 provided in front of the rear side projection portion 91 on the opposite side to the operation portion 5; a fitting portion 93 formed at the front end and fitted into the rear-end opening of the ink containing tube 82*b*; and a collar portion 94 formed after the fitting portion 93.

When the fitting portion 93 is fitted into the rear-end opening of the ink containing tube 82*b*, the fitting portion 93 does not completely seal the rear-end opening of the ink containing tube 82*b* and enables ventilation between inside and outside of the ink containing tube 82*b*. Moreover, the rear end of the biasing member 7 is fitted to the front surface of the collar portion 94.

When any one of the pen tips 81 of the writing bodies 8 is in a retracted state, the rear end of the operation body 9 attached to the writing body 8 in the pen-tip-retracted state is abutted to the abutting wall portion 23 formed on the inner wall of the rear end of the barrel 2. On the other hand, when any one of the pen tips 81 of the writing bodies 8 is in a projected state, the rear end of the operation body 9 attached to the writing body 8 in the pen-tip-projected state is fitted to the latch wall portion 22 formed on the inner wall of the barrel 2.

The front side projection portion 92 of the operation body 9 connected to the rear end of the writing body 8 in the pen-tip-retracted state is abutted to the rear side projection portion 91 of the operation body 9 connected to the rear end of the writing body 8 which has been in the pen-tip-projected state in advance when the operation portion 5 of the operation body 9 is subjected to a forward slide operation. As a result, the pen-tip-projected state of the writing body 8 is released.

The cylindrical biasing-member-supporting portion 2*b* is fixed to the inner wall of the barrel 2 (i.e., front end inner surface of the rear barrel 2*c*). The biasing-member-supporting portion 2*b* has a disk-shaped supporting wall portion. A plurality of (two in this embodiment) inner holes, through which the writing bodies 8 are inserted, are pierced in an axial direction in the supporting wall portion. Each biasing member 7 is disposed between the rear surface of the biasing-member-supporting portion 2*b* and the front surface of the collar portion 94 of each operation body 9. Each of the writing bodies 8 is movably inserted into the inside of each biasing member 7, the front end of each biasing member 7 is fitted by the rear surface of the biasing-member-supporting portion 2*b*, and the rear end of each biasing member 7 is fitted by the front surface of the collar portion 94 of the operation body 9.

A cylindrical portion is extended forward on the front surface of the biasing-member-supporting portion 2*b* (i.e., the front surface of the supporting wall portion). The inner surface of the cylindrical portion and the outer surface of the rear end of the front barrel 2*a* are attached each other by screwing or press-fitting.

Each biasing member 7 always urges each operation body 9 backward. Each biasing member 7 is in a compressed state (i.e., a state that the writing body 8 is urged backward) in any of the pen-tip-projected state and the pen-tip-retracted state and thereby forward and backward bumpy movement of each operation body 9 is prevented.

The friction portion 4 made of a soft material (e.g., an elastic material having low abrasion property such as SBS resin or SEBS resin) is formed on the outer surface of the front end of the barrel 2 (i.e., the outer surface of the front end of the front barrel 2*a*). The friction portion 4 is fixed to the outer surface of the barrel 2 by two-color molding, fitting, press-fitting, screwing, adhesion, or the like.

By holding the thermochromic writing instrument 1 of this embodiment with one hand and pushing the operation portion 5 forward, the pen-tip-retracted state can be quickly shifted into the pen-tip-projected state. By writing on a surface to be written such as paper surface with the pen tip in the pen-tip-projected state, the handwriting of the thermochromic ink 83 is formed on the surface to be written.

After writing, in the state that the thermochromic writing instrument 1 is held with one hand, by pressing forward the other operation portion 5 (i.e., the operation body 9 connected to the writing body 8 in the pen-tip-retracted state) without turning the thermochromic writing instrument 1 to change the holding position of the thermochromic writing instrument 1, the pen-tip-projected state can be quickly changed into the pen-tip-retracted state. With the friction portion 4 in the pen-tip-retracted state, the handwriting of the thermochromic ink 83 formed on the surface to be written can be rubbed and the handwriting is thermally changed in color by the frictional heat generated at the rubbing.

In the fifth embodiment, since the other structure and advantages are common to the first embodiment, explanation thereof is omitted.

<Sixth Embodiment>

Figure 12:
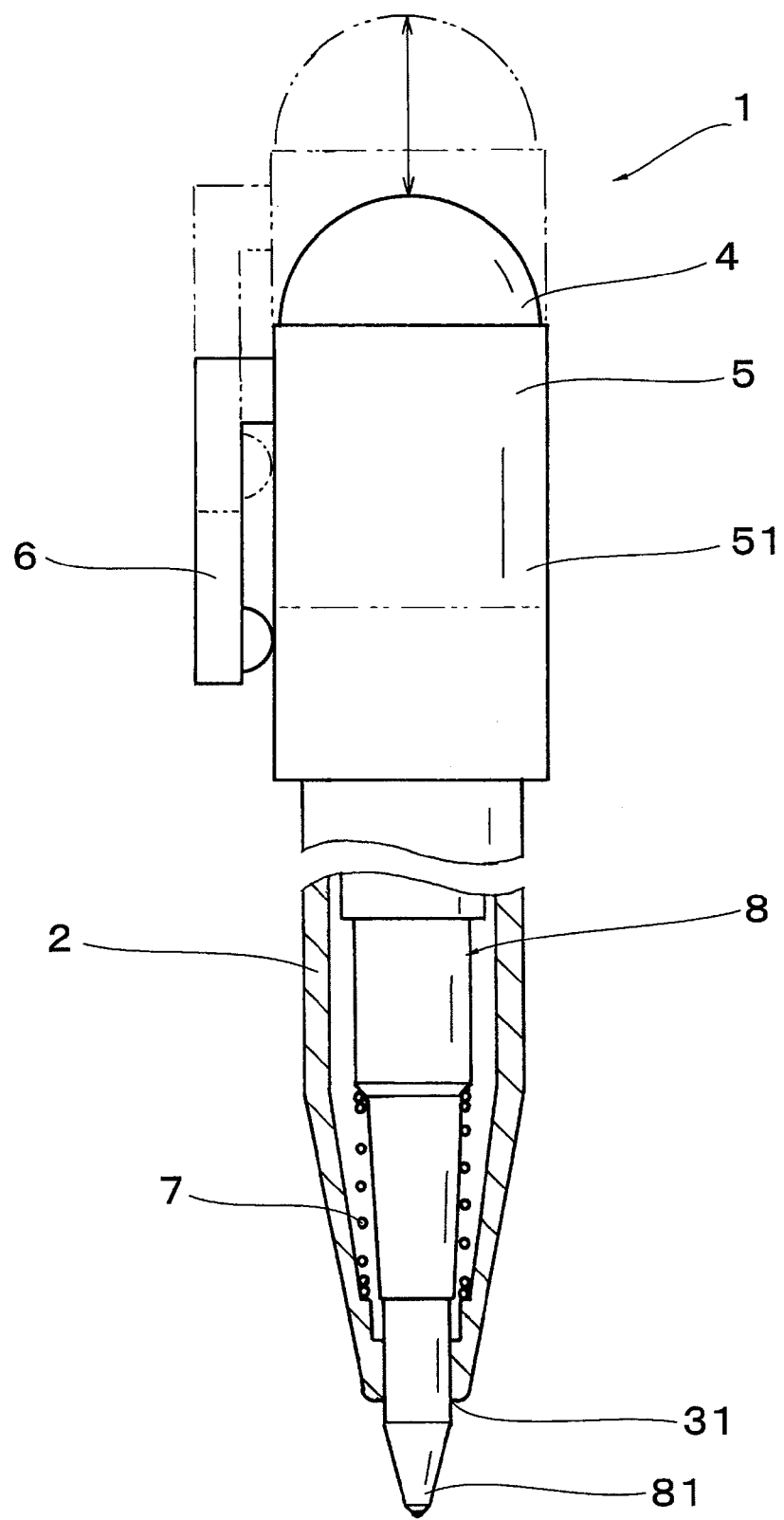
FIG. 12 is a partially broken longitudinal cross-sectional view showing a pen-tip-projected state of a sixth embodiment of the invention.

A sixth embodiment of the thermochromic writing instrument of the invention is shown in FIG. 12.

The thermochromic writing instrument 1 of this embodiment is a modified example of the second embodiment and a point that the friction portion 4 made of a soft material (e.g., an elastic material having low abrasion property such as SBS resin or SEBS resin) is formed on the outer surface of the rear end of the operation portion 5 is a different point from the second embodiment.

In the thermochromic writing instrument 1 of this embodiment, a holding portion 51 capable of holding at rubbing by using the friction portion 4 is provided on the outer peripheral surface of the operation portion 5. Thereby, a stable holding is enabled during rubbing to change the color. For the holding portion 51, the length in an axial direction is set to 10 mm or more, preferably 15 mm or more. Furthermore, in the thermochromic writing instrument 1 of this embodiment, antislip of a finger is achieved at the forward press operation of the operation portion 5 by providing the friction portion 4 made of a soft material to the outer surface of the rear end of the operation portion 5.

After writing with the thermochromic writing instrument 1 of this embodiment, the holding portion 51 of the operation portion 5 of the thermochromic writing instrument 1 is held, the handwriting of the thermochromic ink 83 formed on the surface to be written is rubbed with the friction portion 4, and the handwriting can be thermally changed in color by the frictional heat generated at the rubbing. Thereby, in the thermochromic writing instrument 1 of this embodiment, it becomes unnecessary to retract the pen tip 81 into the barrel 2 during rubbing to change color and the rubbing-to-change-color operation is possible in any state of the pen-tip-projected state and the pen-tip-retracted state.

In the sixth embodiment, since the other structure and advantages are common to the first and second embodiments, explanation thereof is omitted.

<Seventh Embodiment>

Figure 13:
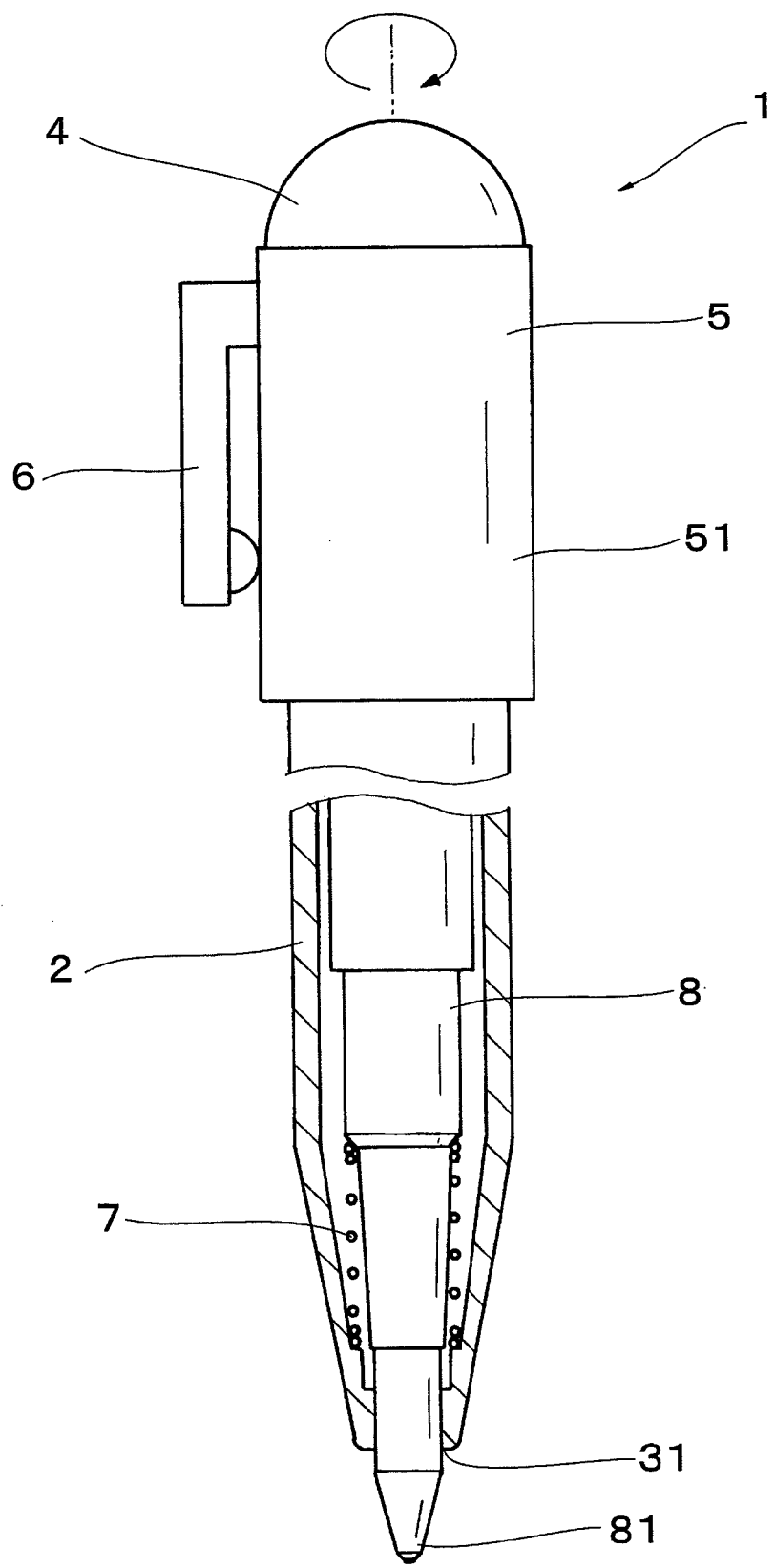
FIG. 13 is a partially broken longitudinal cross-sectional view showing a pen-tip-projected state of a seventh embodiment of the invention.

A seventh embodiment of the thermochromic writing instrument of the invention is shown in FIG. 13.

The thermochromic writing instrument 1 of this embodiment is a modified example of the third embodiment and a point that the friction portion 4 made of a soft material (e.g., an elastic material having low abrasion property such as SBS resin or SEBS resin) is formed on the outer surface of the rear end of the operation portion 5 is a different point from the third embodiment.

In the thermochromic writing instrument 1 of this embodiment, a holding portion 51 capable of holding at rubbing by using the friction portion 4 is provided on the outer peripheral surface of the operation portion 5. Thereby, a stable holding is enabled during rubbing-to-change-color operation. The axial length of the holding portion 51 is set to 10 mm or more, preferably 15 mm or more.

After writing with the thermochromic writing instrument 1 of this embodiment, holding the holding portion 51 of the operation portion 5 of the thermochromic writing instrument 1, and the handwriting of the thermochromic ink 83 formed on the surface to be written is rubbed with the friction portion 4. Thus, the handwriting can be thermally changed in color by the frictional heat generated at the rubbing. Thereby, in the thermochromic writing instrument 1 of this embodiment, it becomes unnecessary to retract the pen tip 81 into the barrel 2 during the rubbing-to-change-color operation and the rubbing-to-change-color operation is possible in any state of the pen-tip-projected state and the pen-tip-retracted state.

In the seventh embodiment, since the other structure and advantages are common to the first and third embodiments, explanation thereof is omitted.

<Eighth Embodiment>

Figure 14:
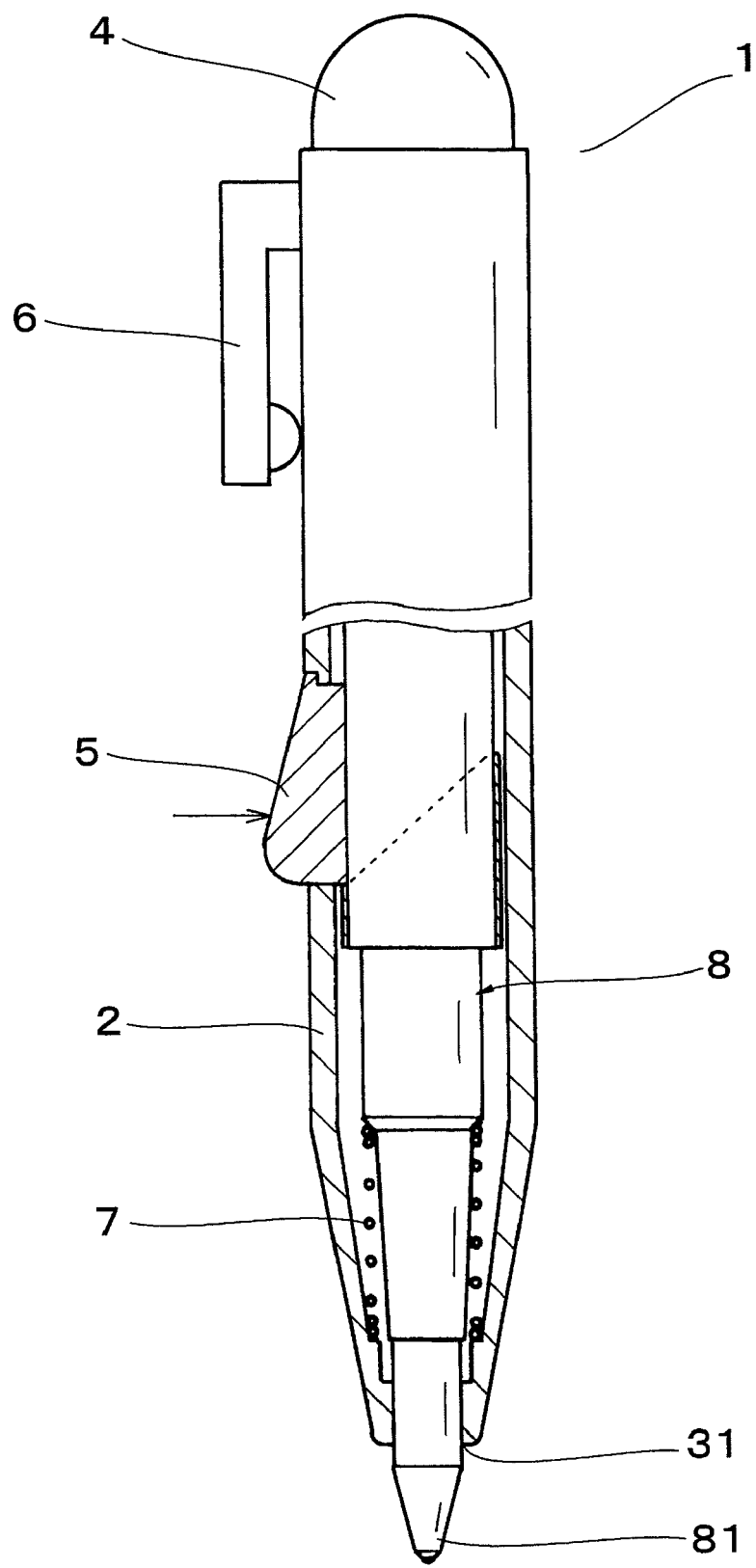
FIG. 14 is a partially broken longitudinal cross-sectional view showing a pen-tip-projected state of an eighth embodiment of the invention.

An eighth embodiment of the thermochromic writing instrument of the invention is shown in FIG. 14.

The thermochromic writing instrument 1 of this embodiment is a modified example of the fourth embodiment and a point that the friction portion 4 made of a soft material (e.g., an elastic material having low abrasion property such as SBS resin or SEBS resin) is formed on the outer surface of the rear end of the barrel 2 is a different point from the fourth embodiment.

In the thermochromic writing instrument 1 of this embodiment, the operation portion 5 can be provided independent of the friction portion 4 and the appearance and size of the operation portion 5 can be freely set. Furthermore, in the thermochromic writing instrument 1 of this embodiment, a stable holding is enabled by holding the rear portion of the barrel 2 during rubbing-to-change-color operation.

After writing with the thermochromic writing instrument 1 of this embodiment, holding the rear portion of the barrel 2 of the thermochromic writing instrument 1 is held, and the handwriting of the thermochromic ink 83 formed on the surface to be written is rubbed with the friction portion 4. Thus, the handwriting can be thermally changed in color by the frictional heat generated at the rubbing. Thereby, in the thermochromic writing instrument 1 of this embodiment, it becomes unnecessary to retract the pen tip 81 into the barrel 2 during the rubbing-to-change-color operation and the rubbing-to-change-color operation is possible in any state of the pen-tip-projected state and the pen-tip-retracted state.

In the eighth embodiment, since the other structure and advantages are common to the first and fourth embodiments, explanation thereof is omitted.

<Ninth Embodiment>

Figure 15:
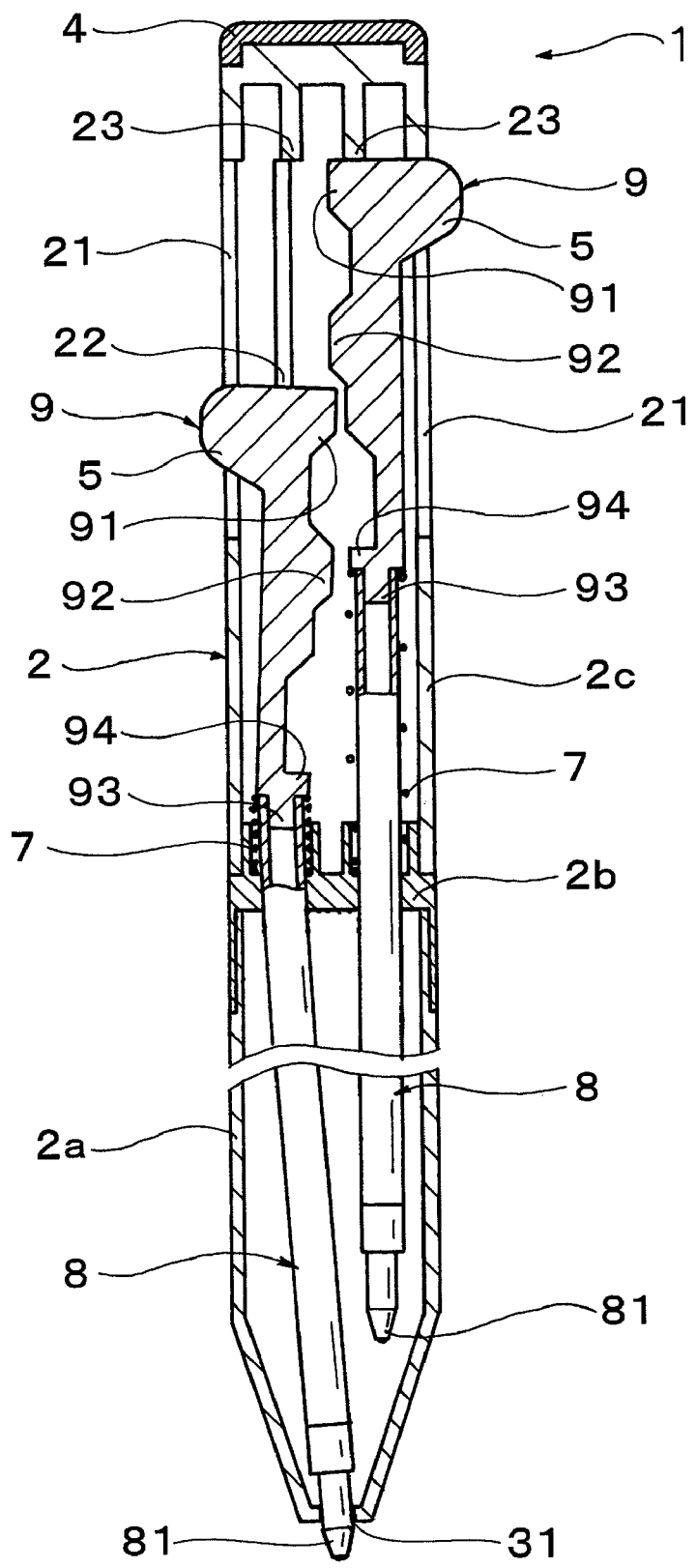
FIG. 15 is a partially broken longitudinal cross-sectional view showing a pen-tip-projected state of a ninth embodiment of the invention.

A ninth embodiment of the thermochromic writing instrument of the invention is shown in FIG. 15.

The thermochromic writing instrument 1 of this embodiment is a modified example of the fifth embodiment and a point that the friction portion 4 made of a soft material (e.g., an elastic material having low abrasion property such as SBS resin or SEBS resin) is formed on the outer surface of the rear end of the barrel 2 is a different point from the fifth embodiment.

In the thermochromic writing instrument 1 of this embodiment, the operation portion 5 can be provided independent of the friction portion 4 and the appearance and size of the operation portion 5 can be freely set. Furthermore, in the thermochromic writing instrument 1 of this embodiment, a stable holding is enabled by holding the rear portion of the barrel 2 during rubbing-to-change-color operation.

After writing with the thermochromic writing instrument 1 of this embodiment, holding the rear portion of the barrel 2 of the thermochromic writing instrument 1, and the handwriting of the thermochromic ink 83 formed on the surface to be written is rubbed with the friction portion 4. Thus, the handwriting can be thermally changed in color by the frictional heat generated at the rubbing. Thereby, in the thermochromic writing instrument 1 of this embodiment, it becomes unnecessary to retract the pen tip 81 into the barrel 2 at the rubbing-to-change-color operation and the rubbing-to-change-color operation is possible in any state of the pen-tip-projected state and the pen-tip-retracted state.

In the ninth embodiment, since the other structure and advantages are common to the first and fifth embodiments, explanation thereof is omitted.

<Tenth Embodiment>

Figure 16:
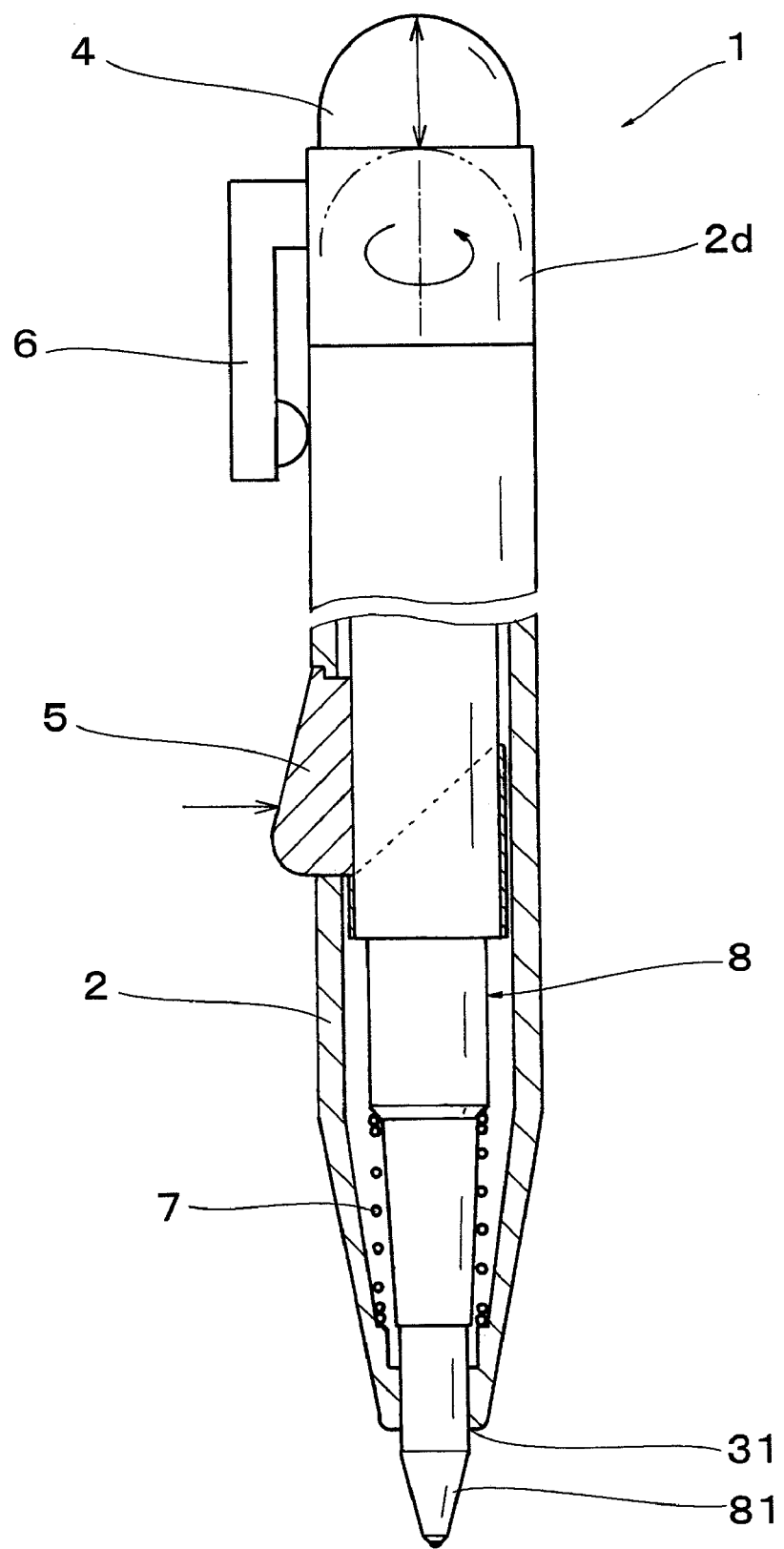
FIG. 16 is a partially broken longitudinal cross-sectional view showing a pen-tip-projected state of a tenth embodiment of the invention.

A tenth embodiment of the thermochromic writing instrument of the invention is shown in FIG. 16.

The thermochromic writing instrument 1 of this embodiment is a modified example of the eighth embodiment and a point that the friction-portion-operation portion 2d is provided on the outer surface of the barrel 2 and the friction portion 4 is constituted in a projectable/retractable manner from/into the rear end of the barrel 2 by a rotation operation of the friction-portion-operation portion 2d is a different point from the eighth embodiment.

In the thermochromic writing instrument 1 of this embodiment, at rubbing, the friction portion 4 can be projected from the rear end of the barrel 2 and used for rubbing. On the other hand, at non-rubbing and thermochromic writing instrument storing state, the friction portion 4 can be retracted to prevent the friction portion 4 from staining.

After writing with the thermochromic writing instrument 1 of this embodiment, holding the rear portion of the barrel 2 of the thermochromic writing instrument 1 and the friction-portion-operation portion 2d is rotated against the barrel 2. Thereby, the friction portion 4 is projected outside from the rear end of the barrel 2, the handwriting of the thermochromic ink 83 formed on the surface to be written is rubbed with the friction portion 4 in the projected state, and the handwriting can be thermally changed in color by the frictional heat generated at the rubbing. In the thermochromic writing instrument 1 of this embodiment, it becomes unnecessary to retract the pen tip 81 into the barrel 2 at the rubbing-to-change-color operation and the rubbing-to-change-color operation is possible in any state of the pen-tip-projected state and the pen-tip-retracted state.

In the tenth embodiment, since the other structure and advantages are common to the first and fifth embodiments, explanation thereof is omitted.

<Eleventh Embodiment>

Figure 17:
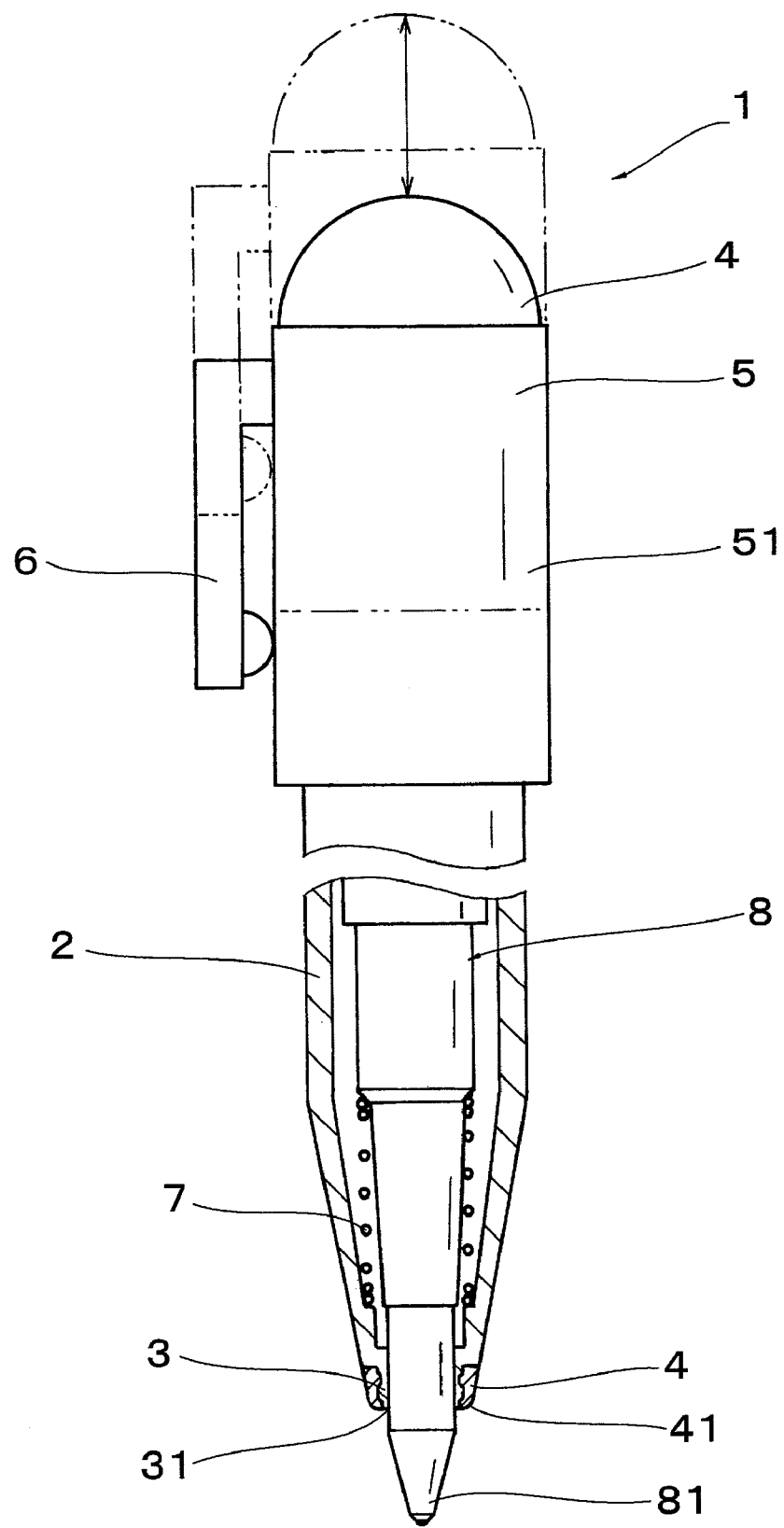
FIG. 17 is a longitudinal cross-sectional view showing a pen-tip-projected state of an eleventh embodiment of the invention.

An eleventh embodiment of the thermochromic writing instrument of the invention is shown in FIG. 17.

The thermochromic writing instrument 1 of this embodiment is a modified example of the second embodiment and a point that a friction portion 4 is provided on the outer surface of the front end of the barrel 2 and a friction portion 4 made of a soft material (e.g., an elastic material having low abrasion property such as SBS resin or SEBS resin) is provided on the outer surface of the rear end of the operation portion 5 is a different point from the second embodiment. The friction portion 4 provided on the outer surface of the rear end of the operation portion 5 has a convex curved surface on the outer surface. The friction portion 4 provided on the outer surface of the front end of the barrel 2 and the friction portion 4 provided on the outer surface of the rear end of the operation portion 5 are different in shape and also are different in size of area to be in contact with the surface to be written at rubbing.

In the thermochromic writing instrument 1 of this embodiment, a holding portion 51, which is capable of holding at rubbing by using the friction portion 4 provided on the outer surface of the rear end of the operation portion 5, is provided on the outer peripheral surface of the operation portion 5. Thereby, a stable holding is enabled during rubbing-to-change-color operation. The axial length of the holding portion 51 is set to 10 mm or more, preferably 15 mm or more. Furthermore, in the thermochromic writing instrument 1 of this embodiment, by providing the friction portion 4 made of a soft material to the outer surface of the rear end of the operation portion 5, anti-slip of a finger is achieved at the forward press operation of the operation portion 5.

After writing with the thermochromic writing instrument 1 of this embodiment, the holding portion 51 of the operation portion 5 of the thermochromic writing instrument 1 is held, the handwriting of the thermochromic ink 83 formed on the surface to be written is rubbed with the friction portion 4 provided on the outer surface of the rear end of the operation portion 5, and the handwriting can be thermally changed in color by the frictional heat generated at the rubbing. Thereby, in the thermochromic writing instrument 1 of this embodiment, it becomes unnecessary to retract the pen tip 81 into the barrel 2 at the rubbing-to-change-color operation and the rubbing-to-change-color operation is possible in any state of the pen-tip-projected state and the pen-tip-retracted state.

Moreover, after writing with the thermochromic writing instrument 1 of this embodiment, the pen tip is retracted, the handwriting of the thermochromic ink 83 formed on the surface to be written is rubbed with the friction portion 4 provided on the outer surface of the front end of the barrel 2, and the handwriting can be thermally changed in color by the frictional heat generated at the rubbing.

In the eleventh embodiment, since the other structure and advantages are common to the first and second embodiments, explanation thereof is omitted.

<Twelfth Embodiment>

Figure 18:
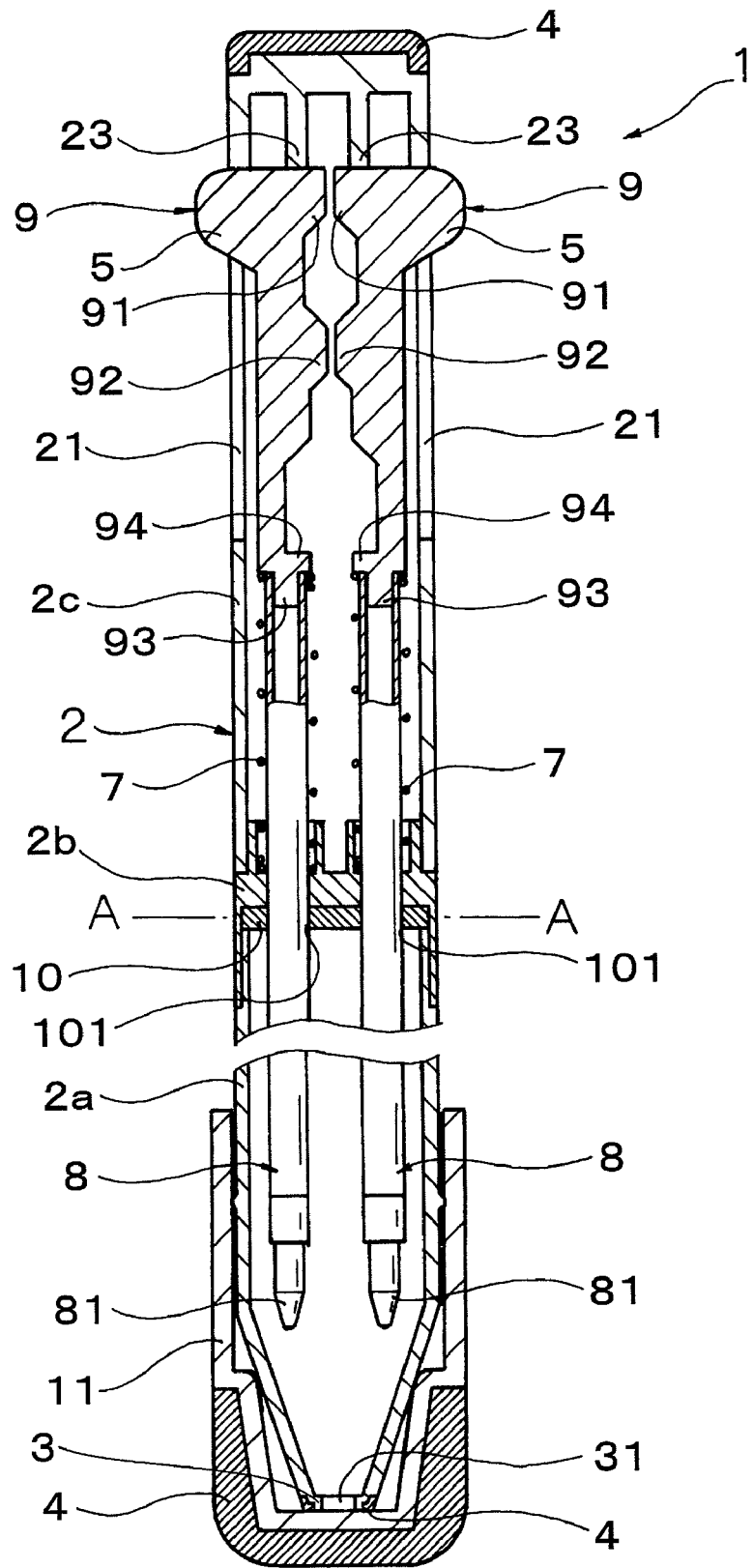
FIG. 18 is a longitudinal cross-sectional view showing a non-writing state of a twelfth embodiment of the invention.
Figure 19:
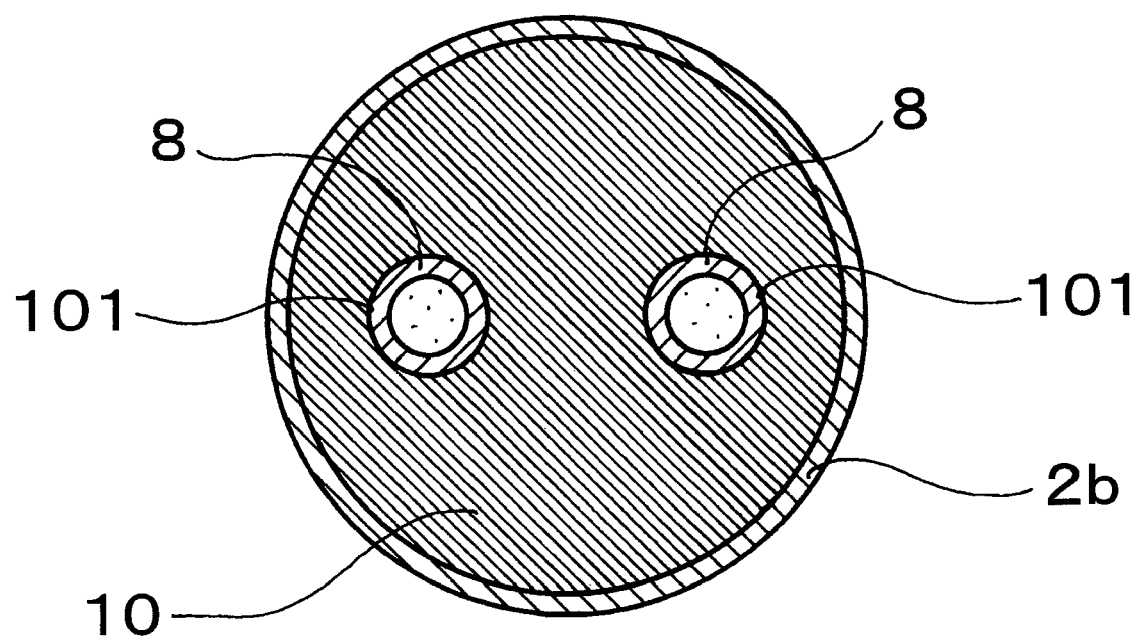
FIG. 19 is an A-A line enlarged cross-sectional view of FIG. 18.
Figure 20:
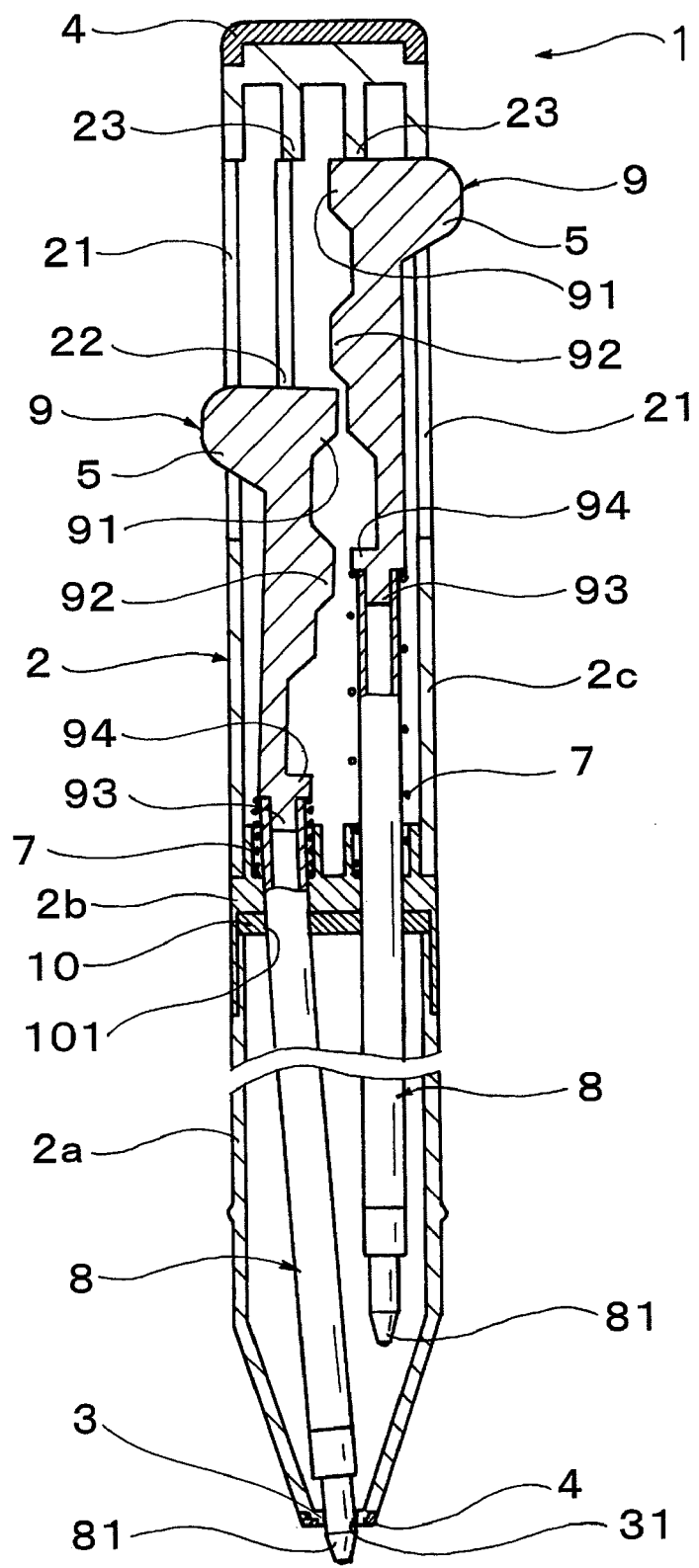
FIG. 20 is a longitudinal cross-sectional view showing a writing state of FIG. 18.

A twelfth embodiment of the thermochromic writing instrument of the invention is shown in FIGS. 18 to 20.

The thermochromic writing instrument 1 of this embodiment is a modified example of the fifth embodiment and a point that the detachable caps 11 are provided on the front end of the barrel 2 and the rear end of the barrel 2 is a different point from the fifth embodiment.

A disk-shaped seal body 10 made of an elastic material is sandwiched and fixed between the front surface of the biasing-member-supporting portion 2b (i.e., the front surface of the supporting wall portion) and the rear end of the front barrel 2a. The seal body 10 is circularly brought into close contact with the rear end of the front barrel 2a. A plurality of (two in this case) holes are pierced in the seal body 10 and the inner peripheral surface of the hole and the outer peripheral surface of each writing body 8 circularly closely slide each other. The hole constitutes a seal portion 101 closely sliding on the outer surface of each writing body 8.

The cap 11 is mounted on the outer surface of the front end of the barrel 2 in not-writing or writing instrument storage state. When the cap 11 is mounted to the outer surface of the front end of the barred 2, the inner surface of the cap 11 circularly comes into close contact with the outer surface of the front end of the barrel 2 and thereby the front-end hole 31 of the barrel 2 is tightly sealed. At writing, the cap 11 is removed from the front end of the barrel 2 and the cap 11 is mounted to the outer surface of the rear end of the barrel, so that lost of the cap 11 is prevented.

A friction portion 4 is formed on the outer surface of the top of the cap 11, the outer surface of the front end of the barrel 2 (i.e., the outer surface of the front end of the front barrel 2a), and the outer surface of the rear end of the barrel 2 (i.e., the outer surface of the rear end of the rear barrel 2c). A friction portion 4 is made of an elastic material (e.g., SBS resin, SEBS resin) which has low abrasion property and hardly generates wear debris during rubbing. The friction portion 4 is fixed to the outer surface of the barrel 2 by means of two-color molding, fitting, press-fitting, screwing, adhesion, or the like.

In the twelfth embodiment, since the other structure and advantages are common to the first and fifth embodiments, explanation thereof is omitted.

While the invention has been described in detail and with reference to specific embodiments thereof, it will be apparent to one skilled in the art that various changes and modifications can be made therein without departing from the spirit and scope thereof.

The present application is based on Japanese Patent Application No. 2007-046226 filed on Feb. 26, 2007, Japanese Patent Application No. 2007-190261 filed on Jul. 21, 2007 and Japanese Patent Application No. 2008-005267 filed on Jan. 15, 2008, and the contents are incorporated herein by reference.

The invention claimed is:

1. A thermochromic writing instrument containing a thermochromic ink, comprising:
    a barrel;
    a writing body accommodated in the barrel so as to be capable of moving in a longitudinal direction; and
    an operation portion, wherein a pen tip of the writing body is adapted to project/retract from/into a front-end hole of the barrel by operating the operation portion, the thermochromic ink is contained inside the writing body, a pen tip capable of ejecting the thermochromic ink is provided at a front end of the writing body, and a friction portion capable of thermally changing color of the handwriting of the thermochromic ink by the frictional heat generated when the handwriting is rubbed with the friction portion is provided on the outer surface of a front end of the barrel.

2. The thermochromic writing instrument according to claim 1, wherein
the friction portion is provided at the front end of the barrel so that a front end of the friction portion is located ahead of a front end of the pen tip in a pen-tip-retracted state and the front end of the pen tip is located ahead of the front end of the friction portion in the pen-tip-projected state.

3. The thermochromic writing instrument according to claim 2, wherein
a pen-tip-supporting portion of the barrel having the front-end hole is made of a hard material and
a friction portion made of a soft material is provided on an outer surface of the front end of the pen-tip-supporting portion of the barrel.

4. The thermochromic writing instrument according to claim 2, wherein
the friction portion and the writing body are maintained in a non-contact state.

5. The thermochromic writing instrument according to claim 2, wherein
the outer periphery of the front end of the friction portion has a convex curved surface or an inclined surface.

6. The thermochromic writing instrument according to claim 2, wherein
an angle defined between a contact line which contacts with an outer surface of the friction portion and the front end of the pen tip in the pen-tip-projected state and an axial line is set to 10 degree or more and 60 degree or less.

7. The thermochromic writing instrument according to claim 2, wherein
the friction portion is provided circularly.

8. The thermochromic writing instrument according to claim 2,
wherein the operation portion is provided at a rear end of the barrel and
the thermochromic writing instrument further comprises a projection/retraction mechanism which shifts the pen tip from the pen-tip-retracted state to the pen-tip-projected state by a forward press operation of the operation portion.

9. The thermochromic writing instrument according to claim 2, wherein
the operation portion is radially outwardly projected from a side wall of the barrel and
the thermochromic writing instrument further comprises a projection/retraction mechanism which shifts the pen tip from the pen-tip-retracted state to the pen-tip-projected state by a forward press operation of the operation portion.

10. The thermochromic writing instrument according to claim 2, wherein
the operation portion is radially outwardly projected from a side wall of the barrel and
the thermochromic writing instrument further comprises a projection/retraction mechanism which shifts the pen tip from the pen-tip-retracted state to the pen-tip-projected state by an radially inward press operation of the operation portion.

11. The thermochromic writing instrument according to claim 2, wherein
the operation portion is provided at the rear part of the barrel and
the thermochromic writing instrument further comprises a projection/retraction mechanism projecting and retracting the pen tip by a rotation operation of the operation portion against the front part of the barrel.

12. A thermochromic writing instrument containing a thermochromic ink, comprising:
a barrel:
a writing body accommodated in the barrel so as to be capable of moving in a longitudinal direction; and
an operation portion,
wherein a pen tip of the writing body is adapted to project/retract from/into a front-end hole of the barrel by operating the operation portion,
the thermochromic ink is contained inside the writing body,
a pen tip capable of ejecting the thermochromic ink is provided at a front end of the writing body, and
a friction portion capable of thermally changing color of the handwriting of the thermochromic ink by the frictional heat generated when the handwriting is rubbed with the friction portion is provided on the outer surface of the barrel,
wherein
the operation portion is provided at the rear end of the barrel,
the thermochromic writing instrument further comprises a projection/retraction mechanism which shifts the pen tip from the pen-tip-retracted state to the pen-tip-projected state by a rotation operation of the operation portion against the front part of the barrel,
the friction portion is provided at the outer surface of the rear end of the operation portion and
a holding portion capable of being held when rubbing with the friction portion is provided on the outer peripheral surface of the operation portion.

13. A thermochromic writing instrument containing a thermochromic ink, comprising:
a barrel;
a writing body accommodated in the barrel so as to be capable of moving in a longitudinal direction; and
an operation portion,
wherein a pen tip of the writing body is adapted to project/retract from/into a front-end hole of the barrel by operating the operation portion,
the thermochromic ink is contained inside the writing body,
a pen tip capable of ejecting the thermochromic ink is provided at a front end of the writing body, and
a friction portion capable of thermally changing color of the handwriting of the thermochromic ink by the frictional heat generated when the handwriting is rubbed with the friction portion is provided on the outer surface of a rear end of the barrel wherein
the operation portion is projected radially outward from a side wall of the barrel and
the thermochromic writing instrument further comprises a projection/retraction mechanism which shifts the pen tip from the pen-tip-retracted state to the pen-tip-projected state by a forward press operation of the operation portion.

14. A thermochromic writing instrument containing a thermochromic ink, comprising:
a barrel;
a writing body accommodated in the barrel so as to be capable of moving in a longitudinal direction; and
an operation portion,
wherein a pen tip of the writing body is adapted to project/retract from/into a front-end hole of the barrel by operating the operation portion,
the thermochromic ink is contained inside the writing body,
a pen tip capable of ejecting the thermochromic ink is provided at a front end of the writing body, and
a friction portion capable of thermally changing color of the handwriting of the thermochromic ink by the frictional heat generated when the handwriting is rubbed with the friction portion is provided on the outer surface of the barrel,
wherein
a friction-portion-operation portion is provided on the outer surface of the barrel and
the friction portion is adapted to be projectable/retractable from/into the rear end of the barrel by operating the friction-portion-operation portion.

15. A thermochromic writing instrument containing a thermochromic ink, comprising:
a barrel;
a writing body accommodated in the barrel so as to be capable of moving in a longitudinal direction; and
an operation portion,
wherein a pen tip of the writing body is adapted to project/retract from/into a front-end hole of the barrel by operating the operation portion,
the thermochromic ink is contained inside the writing body,
a pen tip capable of ejecting the thermochromic ink is provided at a front end of the writing body, and
a friction portion capable of thermally changing color of the handwriting of the thermochromic ink by the frictional heat generated when the handwriting is rubbed with
the friction portion is provided on the outer surface of the barrel,
wherein
the friction portions are provided at the front end of the barrel and the rear end of the barrel,
the front end of the friction portion provided at the front end of the barrel is located ahead of the front end of the pen tip in the pen-tip-retracted state and
the front end of the pen tip is located ahead of the front end of the friction portion provided at the front end of the barrel in the pen-tip-projected state.

16. A thermochromic writing instrument containing a thermochromic ink, comprising:
a barrel;
a writing body accommodated in the barrel so as to be capable of moving in a longitudinal direction; and
an operation portion,
wherein a pen tip of the writing body is adapted to project/retract from/into a front-end hole of the barrel by operating the operation portion,
the thermochromic ink is contained inside the writing body,
a pen tip capable of ejecting the thermochromic ink is provided at a front end of the writing body, and
a friction portion capable of thermally changing color of the handwriting of the thermochromic ink by the frictional heat generated when the handwriting is rubbed with the friction portion is provided on the outer surface of the barrel,
wherein
a plurality of the writing bodies are accommodated in the barrel movably in a longitudinal direction,
each of the pen tips of the plurality of the writing bodies is adapted to be alternatively projectable/retractable from/into the front-end hole of the barrel, and
the handwritings derived from the respective thermochromic ink ejected from the pen tip of each of the writing bodies is rubbed with the friction portion provided on the outer surface of the barrel, and each of the handwriting is capable of being thermally changed in color by the frictional heat generated at the rubbing.

17. A thermochromic writing instrument containing a thermochromic ink, comprising:
a barrel;
a writing body accommodated in the barrel so as to be capable of moving in a longitudinal direction; and
an operation portion,
wherein a pen tip of the writing body is adapted to project/retract from/into a front-end hole of the barrel by operating the operation portion,
the thermochromic ink is contained inside the writing body,
a pen tip capable of ejecting. the thermochromic ink is provided at a front end of the writing body, and
a friction portion capable of thermally changing color of the handwriting of the thermochromic ink by the frictional heat generated when the handwriting is rubbed with the friction portion is provided on the outer surface of the barrel,
wherein
a plurality of the writing bodies are accommodated in the barrel movably in a longitudinal direction,
each of the pen tips of the plurality of the writing bodies is adapted to be alternatively projectable/retractable from/into the front-end hole of the barrel,
a detachable cap is provided at the front end of the barrel,
the cap tightly seals the front-end hole of the barrel when the cap is mounted to the front end of the barrel, and
the handwritings derived from the respective thermochromic ink ejected from the pen tip of each of the writing bodies is rubbed with the friction portion provided on the outer surface of the barrel, and each of the handwritings is capable of being thermally changed in color by the frictional heat generated at the rubbing.

18. The thermochromic writing instrument according to claim 17, wherein
a seal portion closely sliding on the outer surface of each of the writing bodies is provided in the barrel and
the pen tip of each of the writing bodies is tightly sealed between the seal portion and the cap when the cap is mounted to the front end of the barrel.

19. The thermochromic writing instrument according to claim 18, wherein
a biasing member urging each of the writing bodies backward is housed in the barrel,
a biasing-member-supporting portion supporting the rear end of each of the biasing members is provided in the barrel, and a seal body having the seal portion is fixed to the biasing-member-supporting portion.

20. The thermochromic writing instrument according to claim 16, wherein
color in a color-appeared state of the thermochromic ink contained in the inside of each of the writing bodies is different from each other.

21. The thermochromic writing instrument according to claim 16, wherein
a respective complete color-disappeared temperature of the each thermochromic ink contained in the inside of each of the writing bodies is set from 25° C. to 95° C.

22. The thermochromic writing instrument according to claim 17, wherein
a friction portion capable of thermally changing the color of the handwriting of the thermochromic ink by the frictional heat generated when the handwriting is rubbed with the friction portion is provided on an outer surface of the cap.

23. A thermochromic writing instrument containing a thermochromic ink, comprising:
a barrel;
a writing body accommodated in the barrel so as to be capable of moving in a longitudinal direction; and
an operation portion,
wherein a pen tip of the writing body is adapted to project/retract from/into a front-end hole of the barrel by operating the operation portion,
the thermochromic ink is contained inside the writing body,
a pen tip capable of ejecting the thermochromic ink is provided at a front end of the writing body, and
a friction portion capable of thermally changing color of the handwriting of the thermochromic ink by the frictional heat generated when the handwriting is rubbed with the friction portion is provided on the outer surface of the barrel, wherein
a detachable cap is provided at the front end of the barrel and
the cap tightly seals the front-end hole of the barrel when the cap is mounted to the front end of the barrel.

24. The thermochromic writing instrument according to claim 23, wherein
a friction portion capable of thermally changing the color of the handwriting of the thermochromic ink by the frictional heat generated when the handwriting is rubbed with the friction portion is provided on the outer surface of the cap.

* * * * *